United States Patent [19]
Owens et al.

[11] 4,264,808
[45] Apr. 28, 1981

[54] METHOD AND APPARATUS FOR ELECTRONIC IMAGE PROCESSING OF DOCUMENTS FOR ACCOUNTING PURPOSES

[75] Inventors: Clifford J. Owens, Carlsbad; Thomas L. Rutledge, Leucadia, both of Calif.

[73] Assignee: NCR Corporation, Dayton, Ohio

[21] Appl. No.: 948,936

[22] Filed: Oct. 6, 1978

[51] Int. Cl.³ .................... G06F 15/30; G06K 3/12; H04N 1/00; G06G 7/48
[52] U.S. Cl. .................... 235/379; 235/375; 235/432; 340/146.3 Z; 358/256; 360/33; 364/406
[58] Field of Search .......... 360/14, 33, 72.1, 9, 360/72.2, 72.3; 235/437, 379, 462, 432, 431; 340/147 R, 149 R, 146.3 Z; 101/2; 364/900, 409, 406, 408; 283/57; 358/256

[56] References Cited
U.S. PATENT DOCUMENTS

| | | | |
|---|---|---|---|
| 3,121,159 | 2/1964 | Rogal | 340/147 R |
| 3,178,690 | 4/1965 | Masters | 340/172.5 |
| 3,314,049 | 4/1967 | Felcheck | 364/900 |
| 3,375,500 | 3/1968 | Fowler | 340/172.5 |
| 3,455,577 | 7/1969 | Kikumoto | 283/57 |
| 3,531,628 | 9/1970 | White | 235/61.12 |
| 3,652,791 | 3/1972 | Shuey | 178/7.1 R |
| 3,652,795 | 3/1972 | Wolf | 179/2 DP |
| 3,674,924 | 7/1972 | Fischer | 178/6.8 |
| 3,703,628 | 11/1972 | Philipson | 340/146.3 Z |
| 3,712,956 | 1/1973 | Lemelson | 360/33 |
| 3,713,099 | 1/1973 | Hemstreet | 340/146.3 D |
| 3,753,240 | 8/1973 | Merwin | 340/172.5 |
| 3,852,571 | 12/1974 | Hall | 235/379 |
| 3,864,514 | 2/1975 | Lemelson | 178/6.8 |
| 3,909,515 | 9/1975 | Evansen | 178/6 |
| 3,949,363 | 4/1976 | Holm | 340/146.3 D |
| 3,969,612 | 7/1976 | McJohnson | 235/61.11 E |
| 3,988,571 | 10/1976 | Blair | 101/2 |
| 4,027,142 | 5/1977 | Paup | 235/61.9 R |
| 4,028,733 | 6/1977 | Ulicki | 360/33 |
| 4,064,389 | 12/1977 | Patterson | 235/431 |
| 4,077,034 | 2/1978 | Dell | 340/347 DD |
| 4,081,842 | 3/1978 | Harbaugh | 358/256 |
| 4,082,945 | 4/1978 | Van De Goor | 235/379 |
| 4,087,788 | 5/1978 | Johannesson | 340/146.3 AE |
| 4,090,223 | 5/1978 | Holt | 360/35 |
| 4,091,424 | 5/1978 | Widergren | 358/260 |
| 4,126,779 | 11/1978 | Jowers | 235/432 |
| 4,139,869 | 2/1979 | Holt | 360/72.2 |
| 4,205,780 | 6/1980 | Burns | 235/454 |

FOREIGN PATENT DOCUMENTS

1259623  1/1968  Fed. Rep. of Germany ........... 358/127

OTHER PUBLICATIONS

Hellyer, David—"*The Message... without the Medium*", Banking, Journal of American Bankers Association, Oct. 1977, p. 28 et seq.
R. B. Johnson—"Video Text System", IBM Tech. Disc. Bull., vol. 12, No. 12, pp. 2181-2182, May 1970.

*Primary Examiner*—Robert M. Kilgore
*Attorney, Agent, or Firm*—J. T. Cavender; Albert L. Sessler, Jr.; Elmer Wargo

[57] ABSTRACT

A method and apparatus are disclosed for separating the information on documents involved in transactions such as accounting or banking transactions, for example, from the documents themselves and also for placing control of the processing of the transactions on this information instead of on the documents themselves. An image lift unit at a point of acceptance in a banking system disclosed herein generates an electronic image of each of the documents presented thereat and also tags the documents and the associated images with identification indicia to provide entry records which are processed at a processing center in the system to develop accounting source data and to perform accounting transactions with the accounting source data without using the documents themselves and, in turn, to produce data records which are recorded on an archival record along with the images for the associated documents. A point of payment within the system has a display unit for displaying (via the archival record) the data records and images associated with the documents for making acceptance or rejection decisions with regard to the documents and also has a printer for making copies of these documents.

21 Claims, 17 Drawing Figures

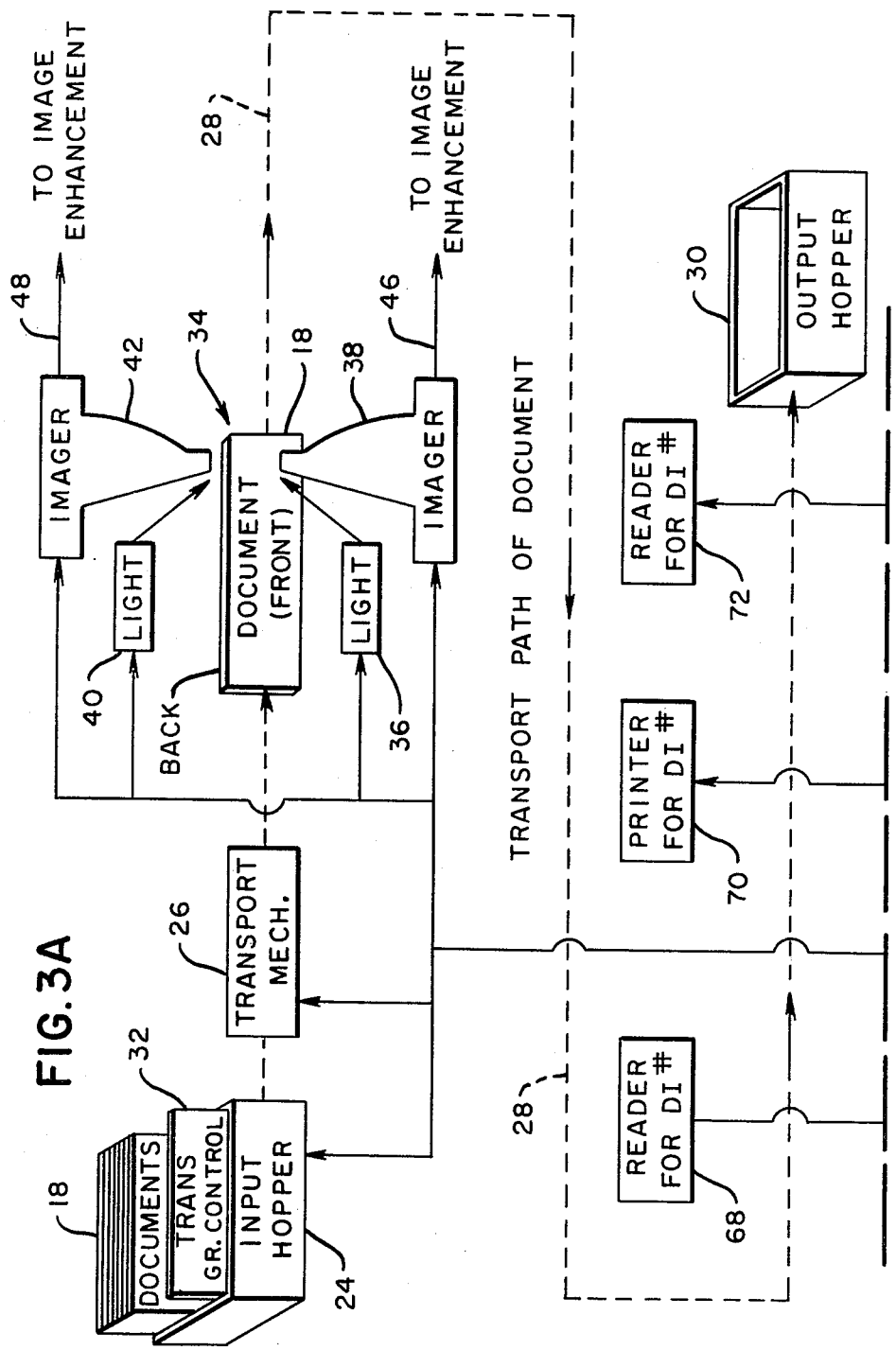

METHOD AND APPARATUS FOR ELECTRONIC IMAGE PROCESSING OF DOCUMENTS FOR ACCOUNTING PURPOSES

BACKGROUND OF THE INVENTION

This invention relates to a method and apparatus for electronic image processing of documents for accounting purposes.

ACCOUNTING ENTRY SYSTEMS

Prior art bank accounting entry systems track debit and credit entries for the bank and its customers. Entries and transactions are the physical entities (documents) of the system which show what action and what needs are required. Over the years, procedures evolved for the processing of entries and transactions which improved the routing of information and the transfer of funds.

Although the physical document such as a check or a deposit slip has value to the bank and customer primarily as a conveyor of information, extensive control procedures have evolved around the document to ensure the durability of that information. The information on the physical document justifies a transfer of funds; accordingly, the inability to produce proof of the existence of a document leaves a bank open for financial loss, since a protest by an account holder concerning the legality of a transaction must be honored if the entry cannot be documented.

ACCOUNTING ENTRIES

The accounting entry is the basic document which substantiates a transfer of funds in any bookkeeping system, either manual, mechanical, or electronic. An entry in banking procedures is a single document containing information about the account and giving the bank an instruction. The entry may either "take from" or "add to" the account. The physical document conveying the entry is important only as far as it preserves the information and the instructions of the entry.

The information associated with an entry is composed of five levels:

1. Information of value. This information tells the amount of money involved in the transfer.
2. Information of control. This information gives the account number and the data of the transfer.
3. Information of instruction. This information tells what is to be done and indicates any special conditions which must be met.
4. Information of authorization. This information, composed of signatures or initials, gives the account holder's authorization to transfer funds. Authorization has legal weight should the transfer be challenged.
5. Information of record. This information, consisting of teller stamps, endorsings, proof machine embossings, gives the bank the ability to trace the physical documents through the system, i.e., who brought in the document; what teller handled it; what day was the transaction made; and which machines processed it?

Information of value, control, instruction, and authorization forms the essence of the accounting entry, while information of record forms the means of controlling that entry. The document comprising the accounting entry (a check, deposit, withdrawal form, etc.) is important only as a vehicle for these five levels of information. Often the importance belonging to the information has been transferred, unnecessarily, to the paper itself.

ACCOUNTING TRANSACTIONS

An accounting transaction consists of two or more balancing entries that direct the bank to move funds from one account to another. The customer directs the flow of funds from a source to a need by presenting a transaction to the bank. The transaction indicates the amount to draw from the source, and the amount to apply to the need. Because this is a transfer of funds, the amount removed from the source must always equal the amount applied to the need.

PRIOR ART PROCESSING ENVIRONMENT

The prior art processing system is organized into three general areas:

1. The point of acceptance, where the transaction physically enters the accounting system for processing. Included are those transactions accepted from depositors and those entries processed through other banks.
2. The point of processing, where transactions from the point of acceptance are processed.
3. The point of payment, where the account resides. At the point of payment, entries are reviewed, verified, amended, and distributed.

(1) POINT OF ACCEPTANCE

At the point of acceptance, where the transaction originates, processing is divided into three stages: transaction acceptance, transaction control and distribution, and transaction batching. The sequence may vary depending on an individual bank's requirements.

Transaction Acceptance

When a transaction is accepted, the teller identification is stamped on the document to establish the point of acceptance in the entry-processing environment, and receipt is made to the customer. The teller writes entries to offset any cash transfer, and the transaction is placed with the day's business.

Periodically, these transactions are collected from the tellers and delivered to transaction control and distribution.

Transaction Control and Distribution

The collected transactions are passed into a primary control and distribution process, called proofing. This step ensures that the debit and credit entries that form the transaction are equal in value, encodes the amount and other data necessary for automated account processing, affixes reference control information necessary to track the transaction in resolving errors, and segregates the entries into accounting entry streams.

Inconsistencies in the balance of the transaction are detected during the proofing operation. These errors may be customer or teller generated, or may be generated by a proofing operator.

Customer Generated Errors

Generally, customer generated errors are errors in addition, subtraction, or listing. The error is corrected by the creation of an entry to the customer account to compensate for the error. An advice-of-action notice is returned to the customer.

Teller Generated Errors

Generally, teller generated errors refer to the substitution entry prepared to offset a cash transfer, the removal of entries, or the mixing of transactions. The transaction is returned to the teller for correction.

Proofing Operator Errors

Generally, proofing operator errors refer to keying errors which are detected and corrected by the operator.

Transaction Batching

During proofing, entries are segregated into "accounting streams". As the streams are produced, a total monetary value for each stream is compiled. The streams are subdivided, or grouped into batches (typically containing about 150 to 200 entries), and are identified by a header with the following encoded information: (1) batch type, (2) a total value for the entries in the batch, and (3) an identifying number. This grouping facilitates the prompt location of errors as the transactions are processed. To maintain an accounting balance, entry batch totals are charged against the general ledger before shipment to the processing center.

Batches of entries to be processed into accounting systems are microfilmed prior to transporting them to the processing location. Microfilming is critical to the entry operation, since the film, in conjunction with listings from the proofing operation, are the only means by which a lost document can be re-created as an accounting entry. Documents not filmed due to operator or mechanical failure represent a potential financial loss to the bank.

(2) POINT OF PROCESSING

Account processing in prior art processing systems is the process whereby data for the accounting system is established. Processing is divided into four stages:

Batch Conditioning

Batches of entries are received from various points of acceptance, including clearing houses, and prepared for data capture. Proof machine tapes are removed from the batches and stored to be used in balancing, a procedure which follows data capture.

Incoming batches are grouped into blocks of work with each block typically containing 3,000 to 4,000 entries. This step provides a quantity of data large enough to support the use of high-speed input capture devices. These blocks of entries are then passed to data capture.

Entry Data Capture

During data capture, blocked batches of accounting entries from batch conditioning are processed through high-speed document transport devices (50,000 to 100,000 documents an hour) to extract the encoded information for account processing and to break the entries into groups for distribution to the point of payment. Data that cannot be extracted will cause an entry to be rejected. Incorrect data impressions may cause an entry to be misrouted or incorrectly posted. Mechanical errors relating to entry feeding or pocketing may cause entries to be misrouted or missed altogether. Entries accepted by the data capture device are removed for the entry distribution process. Rejected entries are collected for the balancing/reconcilement operation. Mechanical errors following data capture may not be detected until the point of payment operation.

Balancing/Reconcilement

As blocks of entries are processed through the high-speed data capture devices, control data is extracted from the batch control document. Control data from each entry is also collected. At the end of the batch run, entry control information is compared to batch control information.

When a discrepancy occurs between the batch control and entry control data, batch reconcilement is required. Rejected entries are listed and matched to the batch control total. If the batch remains out of balance, the proof machine tape is matched to a computer list of entry data to locate errors.

To rectify these errors, the balancing/reconcilement operation creates an adjustment entry. For each error, an adjustment entry is returned to the point of acceptance. While these errors may have resulted from data preparation or entry data capture, adjustment entries are made at the last control point in the processing system. Since the proofing operation is the only control point between the point of acceptance and the point of payment, all adjustments are directed to the point of acceptance.

There are four types of entry errors detected during reconcilement:

(a) Missing Entries

These are entries listed by the proofing operation but not found during data capture. These errors are the result of handling errors made between proofing and data capture.

(b) Extra Entries

These entries are not listed on the proofing tape but are detected during data capture. These errors are the result of handling errors between proofing and data capture. Extra entries may be the offsets to missing entries.

(c) Amount Discrepancy

The discrepancy occurs when the amount of the entry on the proofing tape does not equal the encoded amount detected during data capture. These errors may be the result of faulty proofing at the point of acceptance, faulty amount inscription, or faulty detection during data capture.

(d) Mischarged Batches

These errors relate to general ledger errors made at point of acceptance. A mischarge made against the general ledger is corrected by an adjustment entry to the point of acceptance by the processing center.

Entry Distribution

Entries collected from data capture are either accepted by the system for account processing or rejected as unprocessable. Accepted entries are broken out by this bank and other bank documents. Due to the manual/mechanical nature of the entry distribution procedure, errors may not be detected until the entry is required to document an authorized transfer of funds. Documents for this bank are sequenced into an accounting order at entry distribution for the points of payment. Sequencing usually requires six or seven serial passes on high-speed document sorters. All sequencing is conducted off-line, without processor control to insure document presence.

Rejected entries are listed and totalled manually. Entries that can be remedied are repaired and re-entered in data capture. All other rejected entries are manually distributed to the branch of account (point of payment) for resubmission.

Checks which are drawn on other banks are broken out by clearings point, broken into batches, and wrapped with computer produced detail listings for the associated batches and are sent to the other banks for processing.

(3) POINT OF PAYMENT

The point of payment is the branch or division of a bank which has the ultimate responsibility for the affected account. There are three steps in processing account entries at the point of payment, namely, Exception Processing, Entry Review/Filing, and Statement Processing.

(A) Exception Processing

Exception processing corrects and checks irregular entries. Entry exceptions may be:

(1) Rejected Entries

These are entries which are returned by the processing center as unprocessable. These entries are received as a discrete charged batch and must be researched before errors can be corrected and processable entries produced.

(2) Accounting Exceptions

These are entries which are returned from account processing and which run counter to the processing rules. Exceptions are reviewed by bank officers to determine disposition. They may be reprocessed with encoded application overrides or returned to the point of acceptance for return to the depositing customer.

(3) Irregular Entries

These are the entries which run counter to preparation or acceptance rules. Typically, these irregularities include incomplete preparer information, authorization in question, instructions governing acceptance have been violated, fraudulent physical entries, or the ages of the entries are not acceptable. Offsetting entries are created to reverse the accounting effect of the irregular entries. Irregular entries are returned to the point of acceptance for return to the depositing customers.

(B) Entry Review/Filing

Errors and irregularities are detected during the review/filing operation. Entries are reviewed to determine the integrity of the information of value, control information, and authorization. Entries are then classified as to final disposition.

Entries which are valid are filed to document the movement of funds. These files may stay in the branch until destroyed or may be returned to the account holder. In either case, the entry provides evidence that a valid movement of funds has occurred. Due to manual filing fallibility, entries may be misfiled and, thus, may be inaccessible for documenting a transfer of funds.

Review procedures vary with the type of account amended by the entry. Review procedures validate that information which is impossible to verify automatically. It must, therefore, be verified manually.

(C) Statement Processing

Statements of an account's status are prepared and periodically sent to the account holder. These entries are retrieved from the files and verified against the statement. Statements that are complete are processed for mailing. Statements with missing or extra entries are held for correction.

Missing entries are traced to the point of acceptance for re-creation. If the point of acceptance cannot be determined by the account processing, or if the microfilm record at the point of acceptance is unusable, the statement is delivered to the account holder with a notification of an accounting entry system failure. A challenge concerning the legality of the entry by the account holder must be honored, since supporting documentation cannot be supplied.

Most of the problems which occur in prior art entry processing systems stem from controlling the document or paper. That is, for the information to be available, the document or paper must be available. Consequently, all systems which are dependent on documents or paper to carry information suffer from the problems associated with moving and controlling the documents or paper.

SUMMARY OF THE INVENTION

This invention relates to a method and apparatus for electronic image processing of documents for accounting purposes. A preferred embodiment of the apparatus relates to a banking environment which includes a point of acceptance, a processing center, and a point of payment. The point of acceptance has means for generating an electronic image of information from each document presented thereat and also has means for assigning identification information to the documents and their associated electronic images. The point of acceptance includes means for transmitting the electronic images and their associated identification information to the processing center.

The processing center includes means for receiving transmitted images and information from the points of acceptance for placement in the image storage means. Data development means for receiving the electronic images and associated identification information for a group of documents from the image storage means are used for developing machine usable data for the group of documents; the data development means includes for example means for performing transaction balancing on the machine usable data to produce "qualified" data for a group of documents which are in balance. Data storage means then receive the qualified data for a group of documents which are in balance. The group of documents associated with the qualified data is then shipped from the point of acceptance to the processing center where sorting means thereat manipulate or sort the group of documents according to destinations while using the associated qualified data therefor. Means are provided for interfacing the qualified data for the group of documents with conventional account posting systems for the preparation of reports and the like.

Thereafter, means for reproducing the qualified data are used to prepare an archival file for those documents for which account responsibility is handled at the point of payment where images of the documents and the developed qualified data are used to prepare reports which support all account review, audit, and support functions.

A primary object of the method and apparatus of this invention is to separate the information on documents involved in accounting transactions such as banking transactions, for example, from the actual documents themselves and to place control of the processing of the accounting transactions on this information instead of on the actual documents.

Another object of this invention is to minimize the physical handling of documents involved in accounting transactions, and to provide a system for banking which is more accurate and less costly than prior art systems.

Some of the advantages of the method and apparatus of this invention are:

(1) The advantage of decentralized work availability, without proofing operations at the points of acceptance, permit the scheduling of work and peak-load staffing at the points of acceptance to be stabilized in addition to lowering the operator-skill-level requirements at these points.

(2) The level of skill of operators at the processing centers is reduced. Balancing and consolidations are completed automatically by the system.

(3) Identifiable accounting images are reproduced in required sequences that enhance item location.

(4) The physical handling of accounting entries is held to a minimum.

(5) Immediate information, including reproduction of original documents, of deposit transactions, of account movements, and of specific entries is available for customers, government agencies, and the courts.

(6) Computer controlled image display of all information pertaining to financial entries is available for performing all review and audit functions.

(7) The retrieving of physical documents for processing functions except when required by the customer is eliminated.

(8) Surrogate documents can be computer derived from electronic images if the original entry is lost or destroyed.

(9) Key-entry operators are not required to handle documents or make proof or sort decisions. Optimum key efficiency is thus realized from the key entry operators.

(10) Since the responsibility for the input transaction rests with the point of acceptance, all data developed from the transaction images that is not in balance is returned to the affected point of acceptance for correction. This eliminates adjustments between the processing center and the affected point of acceptance.

(11) Those operations which are data processing in nature are removed from the points of acceptance. The only processing requirements for the points of acceptance are to feed transaction documents into an imaging unit and to make transaction corrections.

These advantages and others will be more readily understood in connection with the following specification, claims and drawing.

BRIEF DESCRIPTION OF THE DRAWING

FIGS. 3A and 3B taken together show a general schematic diagram, in block form, of an image lift unit shown in FIG. 1;

DETAILED DESCRIPTION OF THE INVENTION

Figure 1:
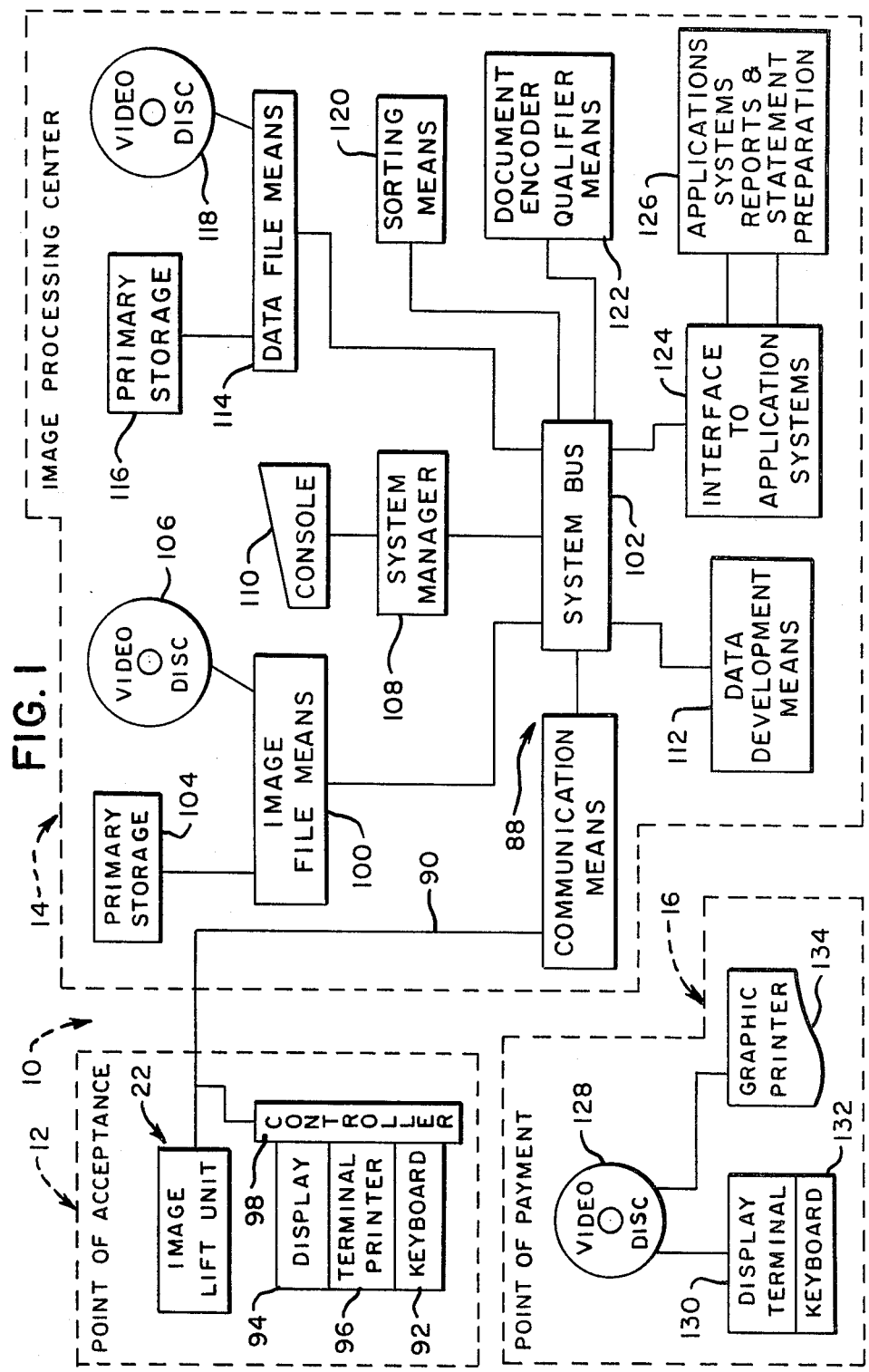
FIG. 1 is a general schematic diagram, in block form, showing a preferred embodiment of this invention as used in a banking environment and which includes a point of acceptance, an image processing center, and a point of payment and their associated elements.

FIG. 1 is a general schematic diagram, in block form, showing a preferred embodiment of this invention as used in a banking environment, with the preferred embodiment being referred to as the banking system 10. The banking system 10 includes, typically, a plurality of: (1) points of acceptance, (2) image processing centers, and (3) points of payment; however, for ease of illustration, only one point of acceptance 12 (hereinafter referred to as POA), one image processing center 14 (hereinafter referred to as IPC), and one point of payment 16 (hereinafter referred to as POP) are shown in FIG. 1.

The function of the POA 12 is to capture (in image form) all the information from documents (checks, deposits, etc.) presented thereat and to prepare and transmit this information to the associated IPC 14. The POA 12 is also responsible for correcting error transactions.

The IPC 14 provides services for several POAs 12 and POPs 16 and is geographically located to provide the services thereto. Basically, the function of the IPC 14 is to extract data from the information received from the associated POAs 12 and put it into a form which can be used for electronic processing for account posting, preparation of reports, and the like. At a certain stage in the processing of the information for a group of transactions at the IPC 14, the associated documents for this group are physically transported from the POA 12 to the IPC 14 where the documents are physically sorted according to destinations determined while data was developed at the IPC 14. Checks drawn on banks outside of the banking system 10 are qualified for shipment of these outside banks.

The POP 16 is that part of the system 10 which has the ultimate responsibility for particular customers' accounts. After processing at the IPC 14, a permanent record medium, (as for example, a video disc) containing the information about accounts for a particular POP 16 is physically shipped to that POP 16 for information support of the customers' accounts retained at that POP 16.

The functions performed by a POA 12 and a POP 16 are such that both functions are typically performed at a branch bank of the banking system 10, and may also be performed at an IPC 14 as will be described later herein.

In explaining the general functioning of the banking system 10, it is appropriate to start at the POA 12 (FIG. 1). At a POA 12, a teller receives documents 18 (FIG. 2) such as checks and deposits representing financial transactions. Banking transactions are processed in transaction groups, with each group having approximately 150 to 200 documents in transaction order.

A certain amount of preparation 20 (FIG. 2) is performed on the documents 18 to prepare them for entry into an image lift unit 22 (hereinafter called ILU) shown in FIG. 1. The preparation 20 includes scrutinizing the documents 18 to eliminate foreign objects and folds and to align them to face in the same direction for entry into the ILU 22.

Figure 3B:
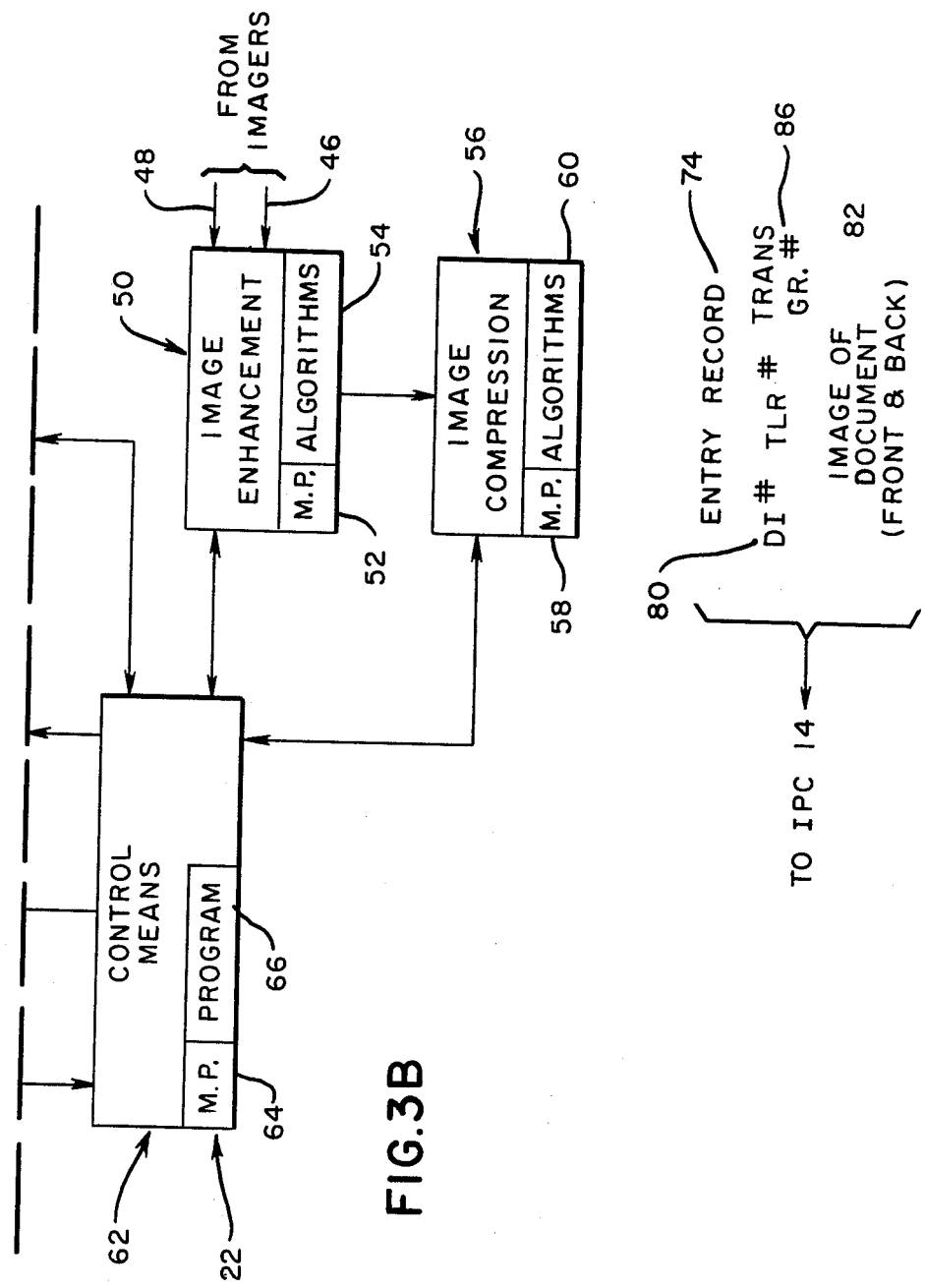

The ILU 22 is shown as a schematic diagram, in block form, in FIGS. 3A and 3B. The ILU 22 is basically similar, in physical form, to a conventional card reader; therefore, the actual physical construction of the ILU 22 need not be shown.

The ILU 22 includes a conventional input hopper 24 (FIG. 3A) for receiving the documents 18, a conventional transport mechanism 26 for moving the documents along a transport path 28, and an output hopper 30 for receiving the group of documents 18 after processing by the ILU 22.

A transaction group control document 32 (FIGS. 2 and 3A) is placed in the input hopper 24 along with the transaction documents 18 in order to identify the particular group of documents which is to be processed. The transport mechanism 26 sequentially moves each one of the documents 32, 18 along the transport path 28 past a conventional imaging device, designated generally as 34. The imaging device 34 is the means for generating an image of each of the documents passing thereby.

The imaging device 34 (FIG. 3A) includes a light source 36 for illuminating the front of a document 18 and an imager 38 for generating an image of or "imaging" the front while a similar light source 40 and imager 42 are utilized for simultaneously illuminating and imaging the back side of the same document 18. In the embodiment described, imaging of the front of the document 18 is effected by scanning from the upper right hand corner (as viewed in FIG. 3A) to the lower right hand corner, and then proceeding from the right edge of the document to the left edge thereof until the entire front thereof is scanned, although other scanning patterns may be employed. Accordingly, the back of the document 18 is simultaneously scanned from the left edge thereof (as viewed from the imager 42 in FIG. 3A) to the right edge thereof until the entire back thereof is scanned.

Each of the imagers 38, 42 shown in FIG. 3A may, for example, be a conventional imaging device such as a CCD imager which is manufactured by Fairchild Inc. or a photodiode array imager which is manufactured by Reticon. These imagers 38 and 42 produce a high resolution digital representation or "image" of each of the documents 18 which allows a representation or image of the document to be recreated in a computer memory, shown on video displays or reproduced on a record medium via graphic printers. The image capture step is shown by block 44 in FIG. 2. The outputs 46 and 48 of the imagers 38 and 42, respectively, are fed into an image enhancement means 50 (FIG. 3B).

The image enhancement means 50 (FIG. 3B) may be any conventional enhancement means which eliminates certain unwanted background data while intensifying meaningful information. At the present time, some of the documents 18 which are scanned by the imaging device 34 contain scenic backgrounds, such as mountains, shorelines, etc., which do not contain meaningful information and can be eliminated as these backgrounds, at times, interfere with the electronic processing of data. The image enhancement means 50 contains a processor such as a microprocessor 52 and conventional algorithms 54 which may be implemented by software or logic in hardware to eliminate the unwanted background data. Some conventional image enhancement means are discussed in U.S. Pat. No. 3,652,791. Essentially, the image enhancement means 50 reduces the gray scale resolution of a digitized image of a document 18 by suppressing the image's low frequency spatial components which are those components changing slowly from light to dark and from dark to light (representing faint background images). The high frequency spatial components of the digitized image of a document 18 are those components which change rapidly from light to dark and from dark to light (compared to the low frequency components) and represent the desired information such as account numbers, dates, amounts, signatures, and the like. The low frequency spatial components which are suppressed are replaced by "white" components with the desired data being replaced by "black" components, thereby reducing the number of gray levels which in turn reduces the number of bits necessary to represent the documents 18.

After the digital representation or image of a document is enhanced by the image enhancement means 50, the enhanced image is routed to a conventional image compression means 56 (FIG. 3B) which includes a processor such as a microprocessor 58 and the necessary algorithms 60 to compress the image received. Typical compression means are shown, for example, in U.S. Pat. Nos. 4,087,788 and 4,091,424. The purpose of image enhancement means 50 and image compression means 56 is to reduce the image bit representation to the lowest possible number while retaining all pertinent information to lower transmission time, and to reduce computer memory, and disk storage requirements.

The input hopper 24, transport mechanism 26, imaging device 34, image enhancement means 50 and the image compression means 56 are controlled by a conventional control means 62 (FIG. 3B) which includes, for example, a processor 64 such as a microprocessor and its associated program 66.

As the document 18, shown at the imaging device 34 in FIG. 3A, is moved further along the transport path 28, it passes a reader 68 which reads a predefined area of one side of the document to sense for a Document Identification number (DI#) which may have been previously assigned to this particular document. For the moment, assume that no previously assigned DI# is present on the document 18 which is further moved along the transport path 28 to a printer 70 (FIG. 3A). The printer 70 is a conventional printer (under the control of the control means 62) which prints a unique DI# on the particular document 18 passing thereby. The unique DI# is printed in conventional coding (such as height modulated or bar-no bar coding) on one side of the document 18 as for example the back side. The printer 70 may be, for example, of the ink-jet type shown in U.S. Pat. No. 4,027,142.

After the document passes the printer 70 (FIG. 3A), it is moved further along the transport path 28 to a reader 72 which reads the DI# which has just been printed or was previously printed thereon by the printer #70. The DI# which is in digital form is then combined with the compressed image and a unique tracing, location, and retrieval number (TLR#) for interval control of the document 18 to form a collection or package of information which is called an entry record 74 (FIG. 3B) which is transmitted to the IPC 14 by means to be later described herein.

Figure 2:
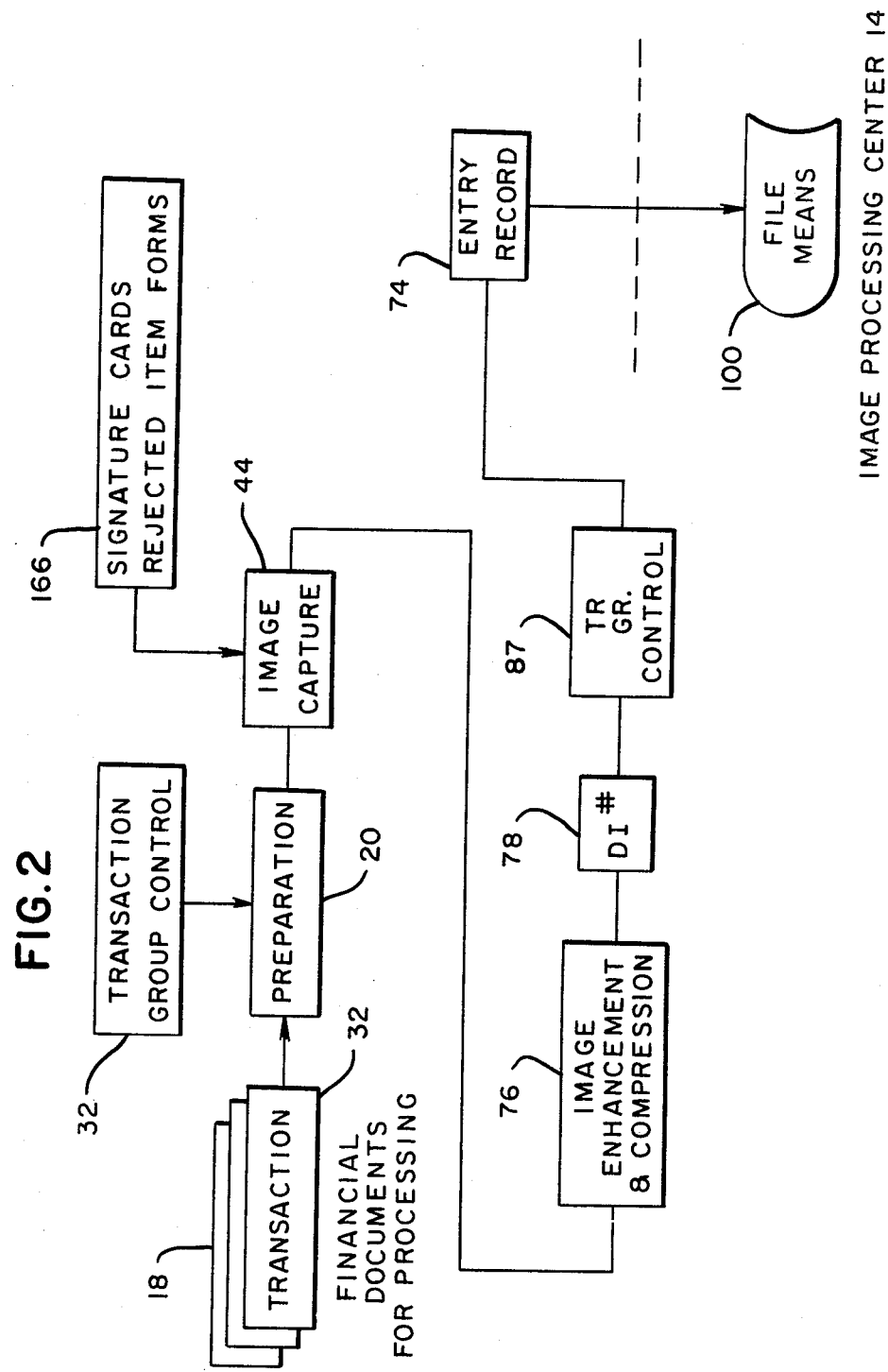
FIG. 2 is a general flowchart representing general functions which are performed at a point of acceptance with regard to financial documents presented thereat.

The image enhancement and compression steps for the image enhancement and compression means (50, 56) are shown as step 76 in FIG. 2, and the addition of the DI# is shown as step 78.

The contents of the entry record 74 are shown only diagrammatically in FIG. 3B; they include the digitized image of both the front and rear of the document 18, the TLR# shown as 82, and the DI# shown as 80. The TLR# is a unique number in digital form which represents the particular bank and branch, and particular ILU 22 which processed the document 18, and the date and a sequence number assigned to each of the documents 18. Basically, the TLR# is used to trace a document back to the particular entry point or POA 22 and is also used as a retrieval number for both the document 18 and the associated digitized image. Essentially, the DI# is used by automated document handling equipment to facilitate distribution of the documents 18.

If a document 18 is entering the banking system 10 for the first time, the DI# and the TLR# will be the same. In some situations, it is necessary to reprocess certain documents which have been through the banking system 10 at a prior time. For example, the same check which was initially refused at the bank for "insufficient funds" may be again used by the receiver of the check by re-depositing the check after the drawer of the check has rectified the insufficient-funds status of his account. In this situation, the prior-assigned DI$\pi$ for the document 18 is sensed or read by the reader 68 (FIG. 3A) and is added to the entry record 74. In summary, only one DI# is ever encoded on a document. The transaction group number (Trans. Gr.#) is entered into the banking system 10 via the transaction group control document 32 (FIG. 3A) and this number represents the particular transaction group or "batch" of 150-200 documents. The Trans. Gr.# may be read by the reader 72 (FIG. 3A) and transferred to the associated entry record 74 (shown as 86 in FIG. 3B) via the control means 62. The step of adding the Trans. Gr.# is represented by block 87 in FIG. 2. After the transaction group control document 32 and the associated documents 18 have been processed at the ILU 22, they are deposited in the output hopper 30. All these documents (32, 18) are then removed from the hopper 30 and are kept together as a batch at the POA 12 until they are later physically transported to the IPC 14 at a certain point in the processing of the associated data at the IPC 14 as will be described later herein. As the entry records 74 (FIG. 3B) are completed, the image data for the documents 18 and the associated identification information are transmitted to the IPC 14 via a communication means 88 (FIG. 1) located at the IPC 14 and a high speed digital communications network or in-house line 90 (FIG. 1) which connects the POA 12 with the IPC 14.

To enable operators at the POA 12 (FIG. 1) to communicate with the associated IPC 14, a conventional keyboard 92, an optionally-provided display 94 (such as a CRT display) and terminal printer 96 are used. The keyboard 92, display 94 and printer 96 are coupled through a conventional controller 98 to the ILU 22 and to the communication means 88 at the IPC 14 via line 90 to conventionally provide communication therebetween.

FIG. 1 contains the elements of the IPC 14 in block form, with the content of these elements being described in more detail later herein. It will be recalled that the IPC 14 performs all data processing and document handling functions within the banking system 10. As the "images" of the documents 18 included in a transaction group or batch are received in the form of entry records 74 (FIG. 3B) by the communication means 88, they are routed to the image file means 100 via a system bus 102 which may be any conventional high-speed bit serial bus. All images and data coming into or going out of the IPC 14 are controlled by the communication means 88, which performs all handshake protocol, logical addressing and communications packaging, and which directs all incoming images and data to the appropriate file means, as for example, image file means 100. The image file means 100 is processor controlled and broadly includes a primary storage 104 which represents, for example, a plurality of high-capacity magnetic discs and a back-up storage or archival file system, shown, for example, as a video disc 106.

A system manager 108 at the IPC 14 (FIG. 1) provides common support functions such as operator consoles 110 (only one being shown), line printers (not shown), program libraries, and non-volatile storage and retrieval of system information needed by other subsystems. The system manager 108 also provides the operator interface to all subsystems of the banking system 10, and conventionally provides the control of initiation, termination and re-start processes. This aspect will be discussed in more detail hereinafter.

The IPC 14 (FIG. 1) also includes a data development means 112 which essentially converts the images of a transaction group of documents 18 into data for machine processing and transaction proofing. Some of the functions performed by the data development means 112 include: (a) data scheduling, which insures that the correct images from the image file means 100 are extracted for processing and which utilizes computer pattern recognition of information in the image; (b) data completion, which provides a human interface to complete the image-to-data coversion where necessary; (c) data qualification, which employs verification routines to prove the correctness of the developed data and to apply document routing information thereto; (d) batch consolidation, which arranges the data as developed at the data development means 112 along with the information comprising the entry record 74 without the image information (hereinafter referred to as data records 74-D) into input transaction groups for batch proving; and (e) batch analysis and proving which verifies that debits equal credits for those documents within a transaction group or batch.

Once the batch analysis and proving is effected by the data development means 112 (FIG. 1), the data records 74-D for a proved transaction group are considered qualified data and are then stored in a particular location within the data file means 114. The data file means 114 is processor controlled and broadly includes a primary storage 116 which represents, for example, a plurality of high-capacity magnetic discs and magnetic tape units, and an optionally-provided back-up storage or archival file system, shown for example, as a video disc 118. One such file system is shown in a publication entitled, "A Review of the MCA Disco-Vision system", by Kent D. Broadbent, and presented on Apr. 26, 1974 at the 115th SMPTE Technical Conference and Equipment Exhibit at Los Angeles, Cal. With both the image file means 100 and the data file means 114, information therefrom is accessed using the TLR of a specific document 18 or the transaction group number 86 associated with a particular batch of documents.

When a particular batch or transaction group of documents 18 has been proved or qualified (indicating that the debits equal the credits for that group) and the associated data records 74-D are placed in the data file means 114, a release from the IPC 14 is made. The associated POA 12, upon receiving this release, then physically ships the documents 18 associated with that transaction group to the IPC 14 for physical sorting of the documents 18 by the sorting means 120 (FIG. 1). During the process of developing the data for a transaction group of documents 18 at the data development means 112, certain sorting destination routing information indicative, for example, of checks drawn on banks other than those associated with the banking system 10 and of checks drawn on banks within the system 10 is added to the data which is placed in the data file means 114 for that transaction group of documents 18 so as to facilitate the physical sorting of the documents 18 at the sorting means 120.

The first sort at the sorting means 120 (FIG. 1) is made to separate the "transit" documents (those drawn on other banks) from the "on-us" documents (those drawn on banks included in the banking system 10). The data records 74-D for a transaction group are extracted from the data file means 114 and utilized by the sorting means 120 to perform the sorting. In this regard, the DI# on a document 18 is read by the sorting means 120 and matched with the DI# contained within the associated qualified data record 74-D to retrieve the associated routing information for sorting the document 18 into the appropriate pocket within the sorting means 120. In this way the sorting means 120 is controlled by data derived by the data development means 112 instead of having to rely on non-controlled information contained on the document itself during sorting by sorting means 120. This enables each document 18 to be accounted for during the sorting means function which reduces errors and reduces manual handling.

In order to satisfy current banking requirements, those "transit" documents which have been sorted out by the sorting means 120 (FIG. 1) must be "MICR qualified" which means that the monetary amount of the document 18 must be MICR encoded thereon; a document encoder qualifier means 122 is provided for this purpose. The encoder qualifier means 122 is basically a conventional MICR printer; however, it includes a reader (now shown but similar to reader 72 in FIG. 3A) for reading the associated DI# on the document 18. The monetary amount for the document is obtained by associating the DI# on the document with the associated data record 74-D in the data file means 114 and the monetary amount is then MICR printed on the document. A MICR reader (not shown) associated with the encoder qualifier means 122 then reads the newly printed data, and a check is performed at the encoder qualifier means 122, insuring that the monetary amount just printed on the document 18 corresponds to the amount stored in the data file means 114. Those "transit" documents which exit from the encoder qualifier means 122 are again sorted at the sorting means 120 according to data identifying the particular banks outside the banking system 10 for the usual processing. Non-qualified "transit" documents 18 are separated, appropriately marked, and sent to the outside banks.

Those "on-us" documents 18 which represent documents drawn on banks or branches within the banking system 10 which were sorted via the sorting means 120 (FIG. 1) are then arranged in an appropriate order for delivery to their final destination.

The data associated with a transaction group of documents 18 is extracted from the data file means 114, and is put in the appropriate format by a conventional interface 124. From the interface 124, the data associated with the "on-us" documents 18 is presented in the desired format to the conventional application systems 126 where reports and application posting are performed. Because there is generally a large investment in the application systems with regard to posting, report, account preparation functions and their associated programs, the interface 126 enables the processing by the banking system 10 to interface with the application systems 126 without any change such as reprogramming in these application systems; this is a feature of this system.

After processing by the application systems 126 (FIG. 1), the data records 74-D from the data file means 114 associated with the production of reports by the application systems 116 and the images of the documents from the image file means 100 are placed on a permanent record or archival file, as for example, a video disc 128. This video disc 128 is physically transported to the associated POP 16 where the disc 128 may be placed on a conventional display terminal 130 having an associated keyboard 132 for selecting portions of the data thereon to be displayed for visual inspection; hard copies of this data to be displayed, including surrogate copies of documents 18, may be obtained by a conventional graphic printer 134 located at the POP 16 and associated with the display terminal 130. The preparation of reports and account statements, etc., will be discussed in detail hereinafter.

Before proceeding with a detailed discussion of the apparatus represented by the various components shown in block form for the IPC 14 shown in FIG. 1, it would appear appropriate to provide a functional description of the general flow of data and information thereat.

One of the premises for the banking system 10 is that the original documents 18 contain all the necessary information for updating the various accounts and for processing within the system 10 whether the information appears in pre-applied form or in human-written form. Therefore, the image of the document 18 which is forwarded from the ILU 22 must represent all this information in a readable form or the document 18 cannot be processed.

As previously stated herein, the image file means 100 contains the raw images of the documents 18 along with their or TRL#s which indicate the sequence in which the documents were received at the associated POA 12, and the data development means 112 (FIG. 1) is utilized to extract data from the raw images of the documents 18 and to put it into a form which can be used for electronic or machine processing. The various functions performed by the data development means 112 are shown in FIG. 10 and will be discussed prior to discussing the elements (FIG. 5C) included therein as some of the processors shown in FIG. 5C perform more than one of the functions included in FIG. 10.

Figure 4:
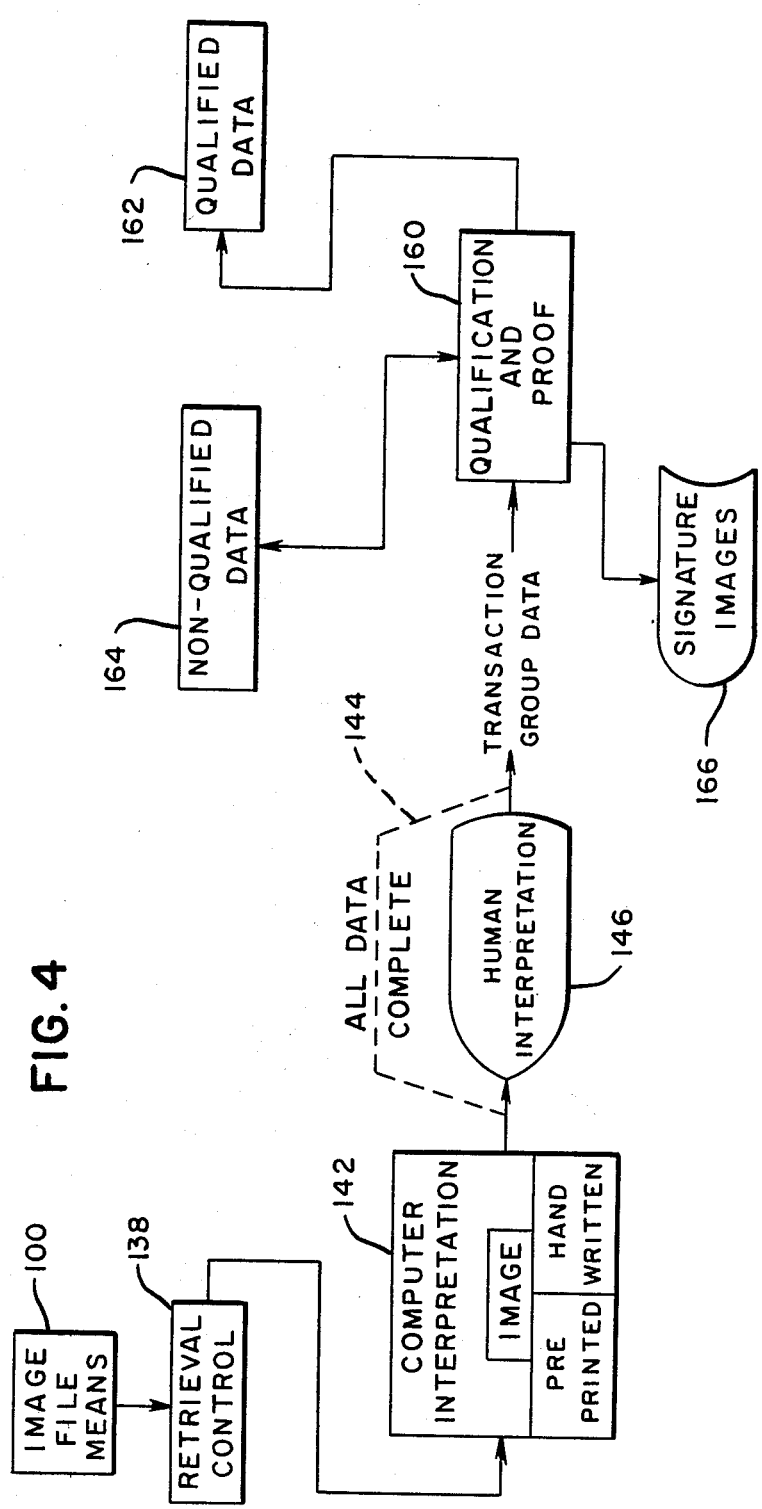
FIG. 4 is a general flowchart indicating how data is developed from images forwarded to the image processing center from a point of acceptance.
Figure 10:
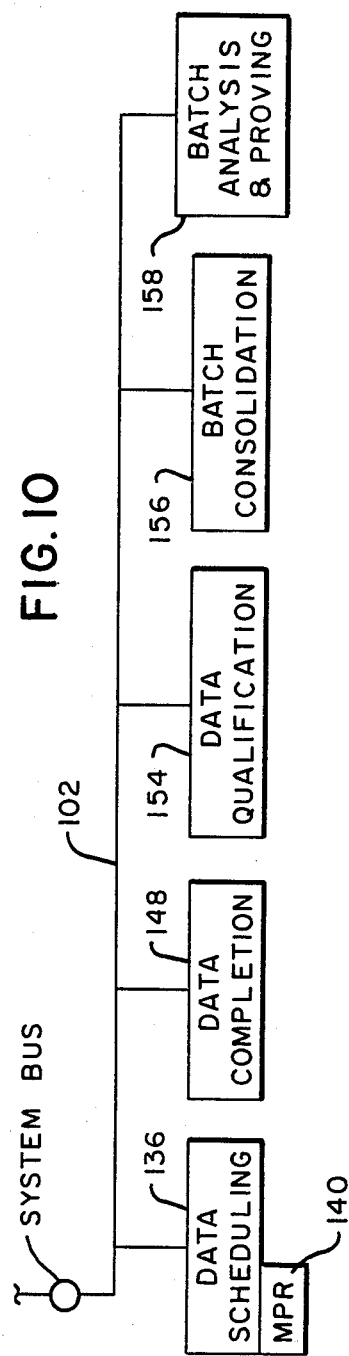
FIG. 10 is a chart showing the general functions performed by the data development means shown in FIG. 1.
Figure 11:
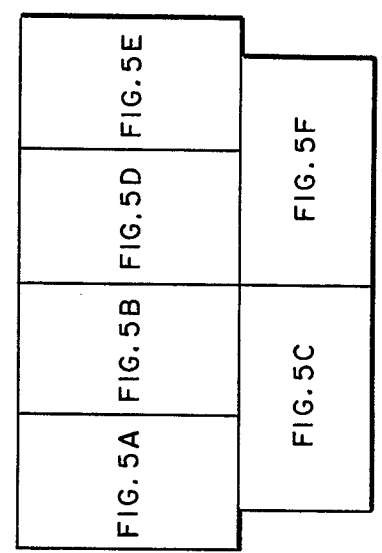
FIG. 11 is a chart showing the layout of FIGS. 5A through 5F which comprise the image processing center.

A data scheduling function 136 shown in FIG. 10 is included in the broad retrieval control step 138 shown in FIG. 4. The scheduling function 136 determines when all the entry records 74 for a transaction group of documents 18 are ready for processing; when ready, these entry records 74 are entered into the data development process by the data development means 112.

The data scheduling function 136 (FIG. 10) utilizes a conventional decompression unit which decompresses the images of the entry records 74 and also utilizes an algorithm which interprets the bit patterns for an entry record 74 and formats the decompressed image to prepare it for machine character recognition functions. A conventional machine pattern recognition (MPR) unit 140 (shown in FIGS. 10 and 5C) is utilized to interpret pre-applied and pre-structured fonts such as E13B and handwritten information (such as monetary amounts which appear on the front of a document). While the interpretation of handwritten monetary amounts is not necessary for viability of the banking system 10, it is a means for increasing the efficiency of the system 10. The data which is machine or computer developed by the MPR unit 140 is conventionally analyzed in step 142 (FIG. 4) to determine what data information is incomplete, requiring human or operator input. If all the data required for processing is complete as represented by dashed line 144 (FIG. 4), the human interpretation step 146 may be eliminated.

The human interpretation step 146 (FIG. 4) is effected in the data completion function 148 (FIG. 10). The particular area of an entry record 74 which requires human interpretation is displayed on a cathode ray tube (CRT) 150 (FIG. 5C) to enable an operator to interpret the particular area of the image thereon and key in the appropriate data (such as the monetary amount) while using a keyboard 152. The data which was just keyed in by the operator is added to the computer-derived data from step 142 to complete the data completion function 148. A plurality of CRTs 150 and keyboards 152 is provided as shown in FIG. 5C to enable a plurality of operators to process a plurality of entry records 74. The step 146 (FIG. 4) completes the development of data to enable a transaction group of documents 18 to be machine processable.

After the data completion function 148 (FIG. 10) is effected, the developed data for a transaction group of documents 18 is then processed for the data qualification function 154 (FIG. 10) which basically checks the developed data against user-verification routines to prove data correctness and to apply routing information (outclearing destinations etc.) to the developed data.

After the data qualification function 154 (FIG. 10) is completed, the developed data for a transaction group of documents 18 is processed for a batch consolidation function 156. Because the developed data may be out of order due to the operators working at different rates of completion in step 146 (FIG. 4), it is necessary to arrange the developed data for a transaction group of documents 18 according to the TLR numbers for that transaction group to complete the function 156.

After the batch consolidation function 156 for a transaction group of documents 18 has been completed, a batch analysis and proving function 158 (FIG. 10) is initiated in which a qualification and proof step 160 (FIG. 4) is performed. During this step 160, a determination is made of those entries which have incorrect data which would prevent account processing and proving (zero balancing). As earlier stated herein, the data is proved or qualified when the debits equal the credits for a transaction group of documents 18. The qualified data (block 162 in FIG. 4) for a transaction group of documents is stored in a particular area of the primary storage 116 of the data file means 114. The data for a transaction group of documents 18 which does not result in a zero-balance is considered non-proved and is shown as non-qualified data (block 164 in FIG. 4) and is stored in a particular area of the primary storage 116 of the data file means 114 until certain correction procedures (to be later described herein) are performed. The status of each group of qualified and non-qualified data for a transaction group of documents 18 is available at all times to the system manager 108 via the console 110 (FIG. 1) and to the associated POAs 12 via the communication means 88 and the associated keyboard 92 and display 94 or printer 96 located at the POA 12. Signature cards or images 166 which are input into the system 10 via the ILU 22 in FIG. 2 are data completed as non-dollar batches by the data development means 112 and are used to derive account and control information therefrom; they are placed in the data file means 114 (FIG. 1) for use in updating master files which are used in reporting as will be later described herein.

Figure 6:
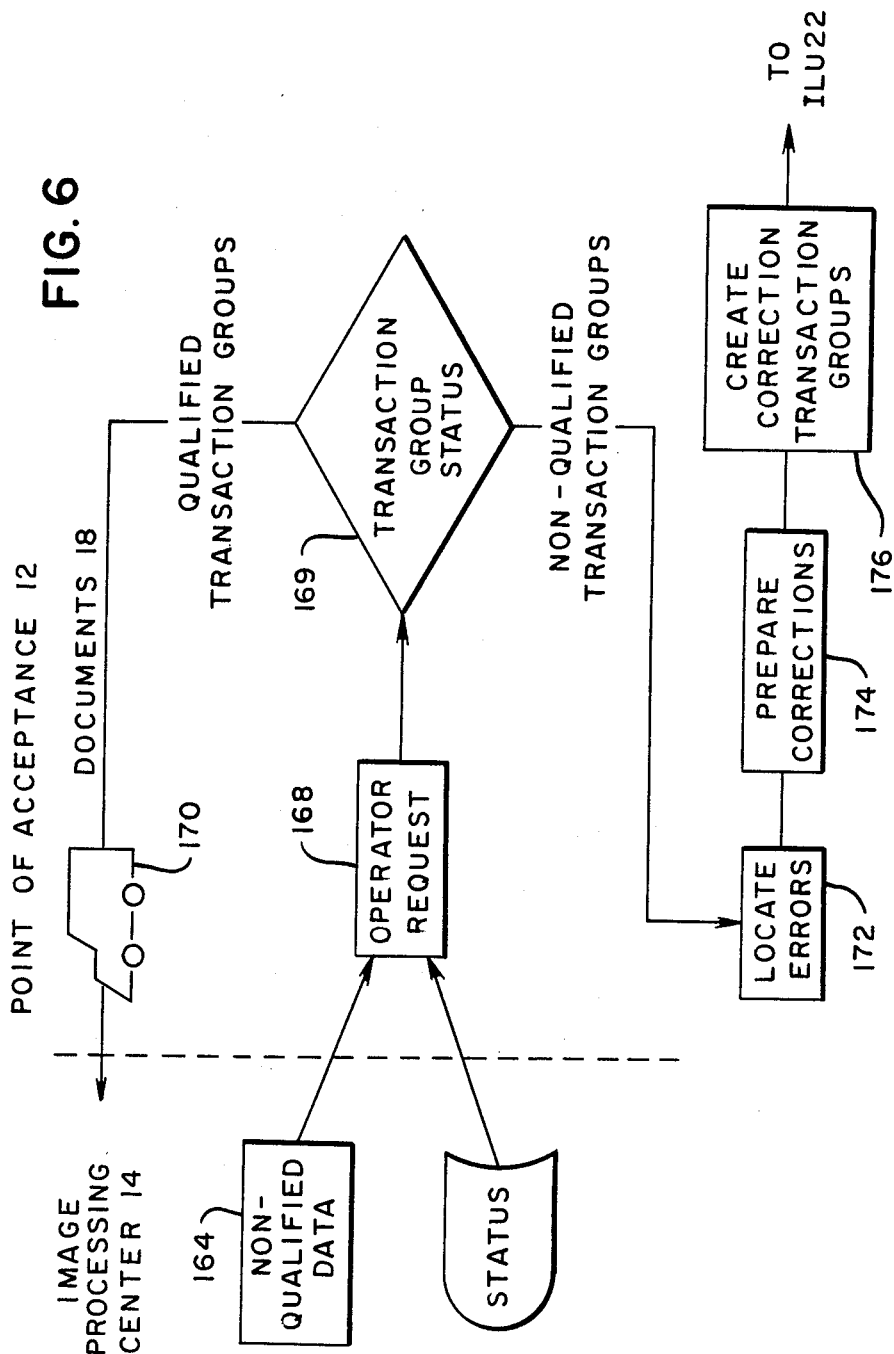
FIG. 6 is a flowchart showing, mainly, error correction procedures at a point of acceptance for bringing a transaction group of documents into balance.

The responsibility for bringing the non-proved or non-qualified data 164 (FIG. 4) for a transaction group of documents 18 into balance resides with the particular POA 12 which forwarded the associated entry records 74 to the IPC 14 because the particular documents 18 which comprise the transactions and the associated depositor account relationship along with the tools for effecting the necessary changes all reside at this POA 12. As data for a transaction group of documents 18 is developed by the data development means 112, it is stored by the data file means 114. An operator at a POA 12 can then request (step 168 in FIG. 6) from the IPC 14 the associated transaction group status (step 169 in FIG. 6). The transaction groups having qualified data are then transmitted via the communication means 88 to the associated POA 12, and the transaction group numbers may be printed on a list by the terminal printer 96. An operator at the POA 12 then physically ships to the IPC 14 (via step 170 in FIG. 6) the documents 18 for those transaction groups whose data is qualified, and the groups of qualified data 162 (FIG. 4) are released by the IPC 14 for subsequent processing to be later described herein.

For a group of non-qualified data 164 (FIG. 4) the operator at the POA 12 requests the IPC 14 to send the data which has been developed for each document 18 included within the group. The non-qualified data 164 for a transaction group is transmitted to the POA 12 and printed on a printout report by the terminal printer 96. Using the printout report and the associated documents for the group of non-qualified data, an operator is able to locate the associated errors as shown in step 172 in FIG. 6. These errors are those described earlier herein, and generally include errors made by a depositor, errors due to missing or extra documents, and errors due to faulty data interpretation. Correction documents are prepared by the operator (step 174 in FIG. 6) which correction documents identify the particular document 18 or account involved, and missing documents 18 are located and are included with the correction documents to form a transaction correction group (step 176 in FIG.

6). A transaction group control document similar to document 32 (FIG. 3A) is also prepared. Because the ILU 22 is the only input device to the banking system 10, a transaction group control document (similar to document 32) along with the necessary correction documents are then processed through the ILU 22 to forward the associated entry records 74 therefor to the IPC 14. The entry records 74 for this transaction correction group, when received at the IPC 14, are then processed by the data development means 112 as previously described to update the associated non-qualified data 164 stored in the data file means 114. The correction and release-of-documents process described in relation to FIG. 6 takes place throughout a processing day at the POA 12 to provide a steady stream of work to the IPC 14.

A major requirement of any financial entry processing system entails the movement of documents to their final outclearing destinations. At the IPC 14, all document movement is performed under processor control so that when documents cannot be accounted for, corrective action can be initiated.

Figure 7:
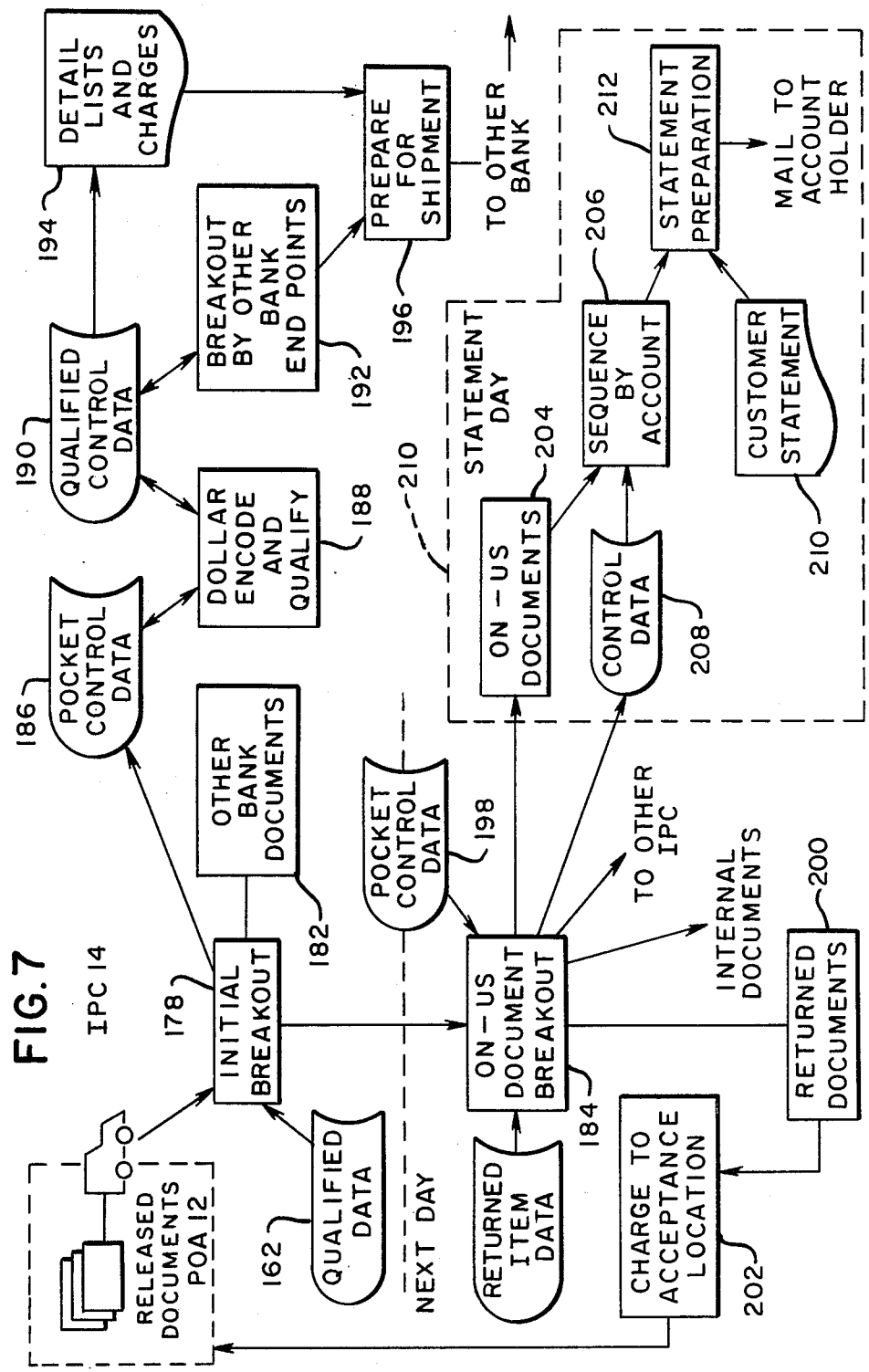
FIG. 7 is a flowchart showing the movement of documents at an image processing center for a qualified document in a transaction group.

FIG. 7 is a flowchart showing the movement of released documents for a qualified transaction group from a POA 12 to their outclearing destinations. The documents for a qualified transaction group are placed in the sorting means 120 (FIG. 1) where the documents are sorted in an initial breakout (step 178 in FIG. 7) based on the sort decisions that were placed in the qualified data (step 142 in FIG. 4) for that transaction group which was placed in the data file means 114 (FIG. 1). Because the sorting techniques have already been described in detail in relation to the sorting means 120 of FIG. 1, this aspect of FIG. 7 will be described only briefly. The transaction group control document 32 (FIG. 3A) for the qualified documents in a transaction group is also placed in the sorting means 120 along with the associated documents 18 in order to extract the qualified data 162 from the data file means 114 for that transaction group. All the qualified data (shown as pocket control data 186) for that transaction group is then placed in the processor memory associated with the sorting means 120. The transaction group control document 32 is then placed in an internal document pocket within the sorting means 120. As each document 18 for the transaction group passes through the sorting means 120, the document control number (from document 32) that was placed in the bar code on that document 18 is read and associated to the associated qualified data record 74-D. The sort decision which was placed in the data record 74-D is retrieved and the associated document 18 is directed by the sorting means 120 into the appropriate destination pocket therein. The data record for this document 18 is then written into a control file (in the memory of the sorting means 120) for that pocket.

During the initial breakout or sort 178 (FIG. 7), the "transit" or other bank documents 182 are separated from the "on us" documents 184. The other bank documents 182 are then amount or dollar MICR encoded at step 188 in FIG. 7. Using the qualified control data 190, the documents 18 are further sorted by other bank end points as shown in step 192. Any discrepancies or exceptions found are noted by updating the qualified control data 190. The exception documents are removed from the qualified documents and broken out separately. Detail listings 194 are produced using the qualified control data 190 in conjunction with a printer 318 (FIG. 5D) associated with the system manager 108 (FIG. 1). The transit documents 18 along with their associated detail lists 194 are prepared for shipment in step 196.

The on-us documents 184 in FIG. 7 are sorted according to an intermediate sequence which best accommodates the preparation of statements for customers' accounts using the associated pocket control data 198 as previously described. In some situations, on-us documents are rejected by the associated POP 16 as described later herein as a result of a review 226 shown in FIG. 8. The associated data in the data file means 114 for these returned documents is updated to reflect this fact and these returned documents 200 are charged to the particular POA 12 in step 202 and returned thereto for corrective action. Certain on-us documents 18 which are received and initially processed at one IPC 14 are also separated in step 184 and are forwarded to another IPC within the banking system 10 for processing at that IPC.

The on-us documents 204 (FIG. 7) which are to be processed by this particular IPC 12 are then sequenced by customer account number in step 206 using the associated control data 208 therefor. The functions performed within the dashed line 210 in FIG. 7 occur on statement preparation day. The control data 208 at this time has been rearranged into the appropriate machine code and data format by the interface 124 (FIG. 1) to make the data compatible with existing application systems for posting and for the preparation of customer account statements 210 and for the preparation 212 of the statements along with the documents for mailing to the account holders. If a particular document is missing, a surrogate copy of the document may be produced at the associated POP 16 by using the video disc 128 and graphic printer 134 as previously described herein.

The qualified data 162 (FIG. 7) which was rearranged by the interface 124 (FIG. 1) to produce the control data 208 (FIG. 7) is also retained in the qualified data format within the data file means 114 to become the basis for account reporting. The application systems 126 (FIG. 1) prepare journals which reflect the daily postings just completed. These journals are analyzed, and the results of the posting for each entry, i.e., post or reject, are determined. The qualified data record is located in the sorted data file within the data file means 114, and the posting results are now ready for the reporting subsystem shown in FIG. 8. A feature of the banking system 10 is that the application systems 126 (FIG. 1) may be re-programmed to utilize the qualified data in data file means 114 directly and update them as a result of posting. In this event, the interface 124 on FIG. 1 could be eliminated.

Figure 8:
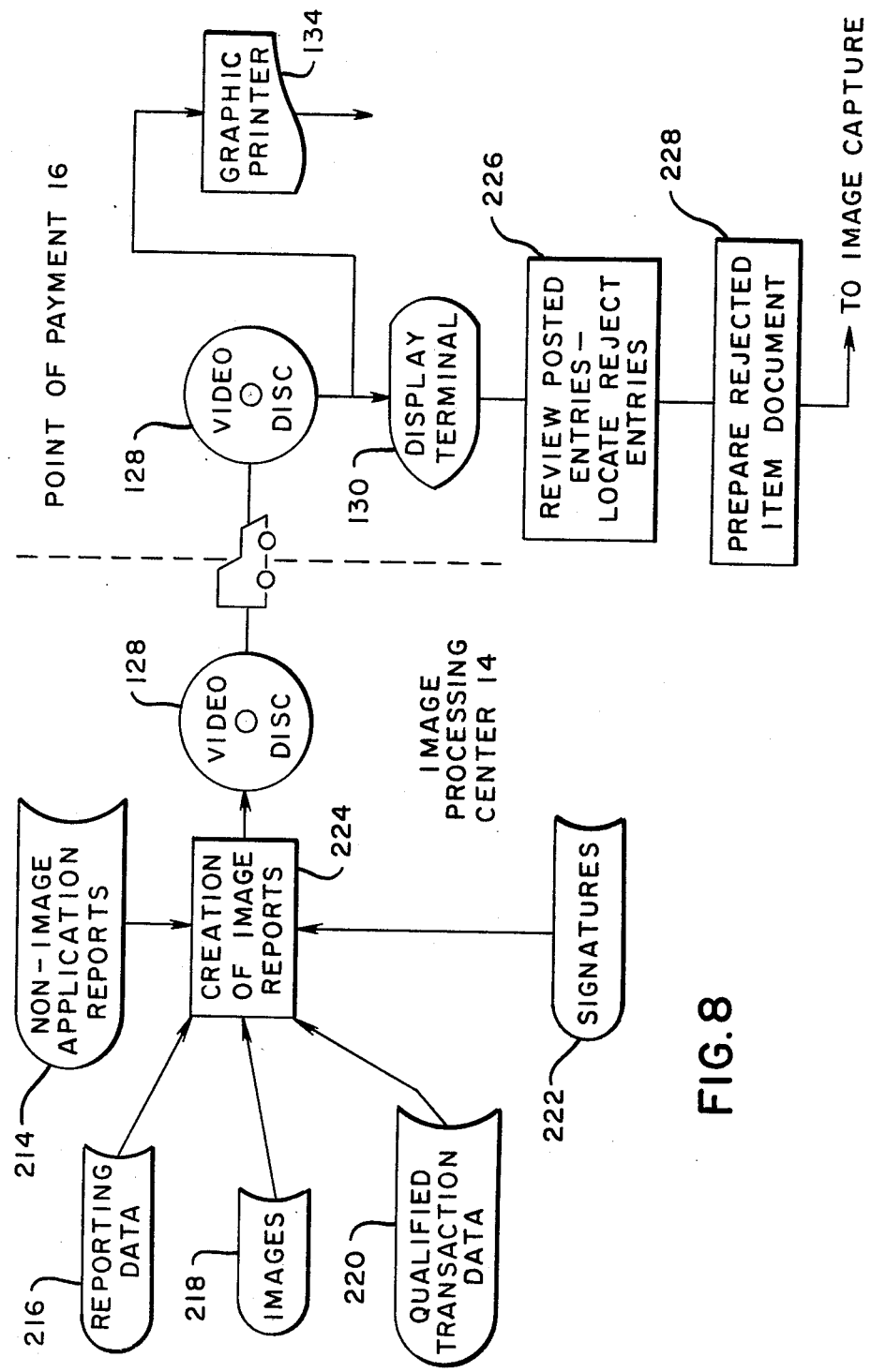
FIG. 8 is a flowchart showing the creation of reports for the associated point of payment.

FIG. 8 is a flowchart which illustrates the creation of electronic reports for a POP 16 for review, audit and customer service functions performed thereat. This is a very important concept of the banking system 10, that is, to put all information to support funds movement at the POP 16 location which has responsibility for the associated customer's accounts.

The qualified data for each of the transaction groups of each POA 12 is used to create an entry order journal. The image (front and back) of each document 18 from the image file means 100 plus the qualified data from the data file means 114 forms a data base which provides information about all entries within a transaction group. This entry order journal is used to answer deposit questions and to create surrogates for those documents 182

(FIG. 7) which were shipped to other banks not included in the BANCR system 10.

With regard to FIG. 8, the various reports (non-image application reports) shown as 214, various reporting data 216, the associated images 218 from the image file means 100, qualified transaction data 220 from the data file means 114 and the associated signatures 222 from a signature file means located at IPC 14 are used to create image reports 224 at the associated IPC 14. These image reports 224 include the unique TLR, account control signatures, the qualified data, any special information put out by the posting or application system 124 (FIG. 1), and the front and back image of the document. These reports 224 are prepared electronically, using any conventional permanent record or archival techniques, and are placed on the permanent record which is shown, for example, as a video disc 128 in FIG. 8. The video discs 128 (FIGS. 8 and 1) containing the information about a particular POP 16 are physically transported to that POP 16 for review thereat.

At the POP 16, the video disc 128 containing information is utilized to display the data on the display terminal. The review of posted entries (step 226 in FIG. 8) permits an examination of all the entries without access to the physical documents 18 themselves (by using the images thereof) to insure that each entry contained all the required information such as valid data, signature, amount, endorsement, etc. Decisions on the payment or refusal of posting rejects is made by bank officers using the image and data information from the video disc 128. Those entries which are to be refused as a result of the review 226 are placed in the banking system 10 by preparing a rejected item document (step 228) and this document is then entered into the ILU 22 which is located at the POA 12. Each branch bank within the banking system 10 generally performs the functions represented by the POA and POP 16. The rejected item document is then identified in a transaction group of refusal documents when entered at the ILU 22. The entry record 74 for a rejected item document is then forwarded to the associated IPC 14 for processing thereby according to the techniques already explained. These rejected item documents are shown as returned documents 200 in FIG. 7.

In providing customer service in relation to FIG. 8, for either a deposit or account inquiry, for example, the associated video disc 128 for the entry in question is accessed. The images relating to the questioned entry may then be viewed on the display terminal 130, or a hardcopy surrogate may be produced on the graphic printer 134 and given to the customer. The record medium, such as the video disc 128, selected for the banking system 10 should have an indefinite life to meet the financial institution's archival requirements.

Figure 9:
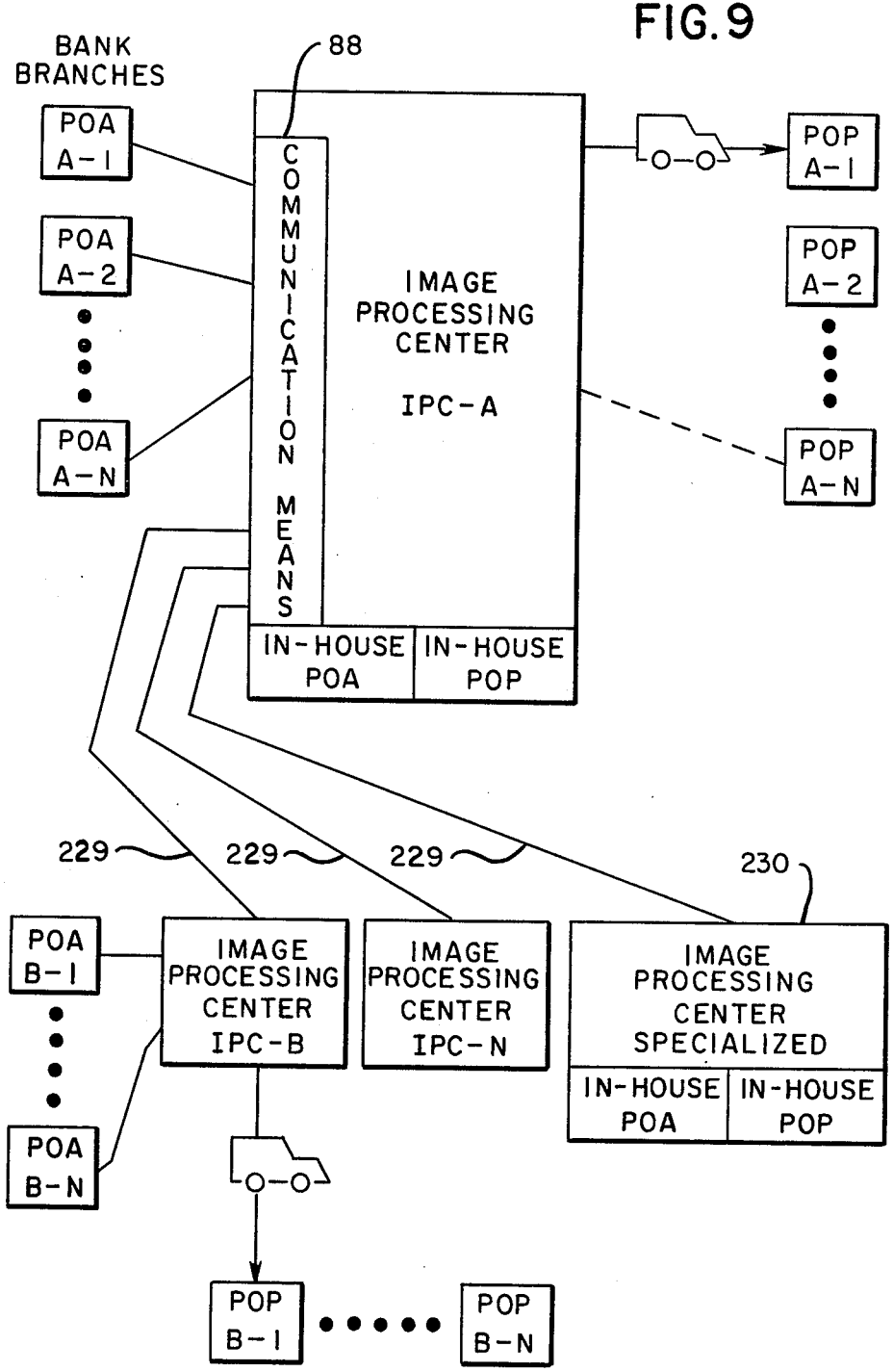
FIG. 9 is an organizational chart showing the flexibility of the preferred embodiment.

FIG. 9 is an organizational chart which shows the flexibility of the banking system 10 and how information flows between the various IPCs 14 within the system 10.

The banking system 10 as described in relation to FIG. 1 was kept simple so as to facilitate a description of the basic functions of the system 10. The relationship between POAs 12, IPCs 14, and POPs 16 in an expanded banking system 10 is shown in FIG. 9 and the various POAs, IPCs and POP s are identical to those already described. The IPC-A shown in FIG. 9 has a plurality of POAs (POA A-1 through POA A-N) and a plurality of POPs (POP A-1 through POP A-N) associated therewith as shown. Because IPC-A may itself be a bank, it may cater to an "in-house" POA and POP. IPC-B similarly has a plurality of POAs (POA B-1 through POA B-N) and a plurality of POPs (POP B-1 through POP B-N) associated therewith. The particular IPCs may communicate with each other through a conventional high speed communication network shown as lines 229, which is connected to the communication means 88 already described in relation to FIG. 1.

In general, the IPCs (FIG. 9) are located geographically as close as possible to the associated POAs so as to reduce transportation time for transporting documents 18 etc., to improve work flow, and to reduce high-speed communication costs.

A particular IPC such as IPC-A in FIG. 9 receives entry records 74 from it associated POAs and it processes these records 74 as previously described. The qualified data developed as previously described for "on-us" documents received at IPC-A are used to prepare the necessary reports, application posting, etc., for those POPs A-1 through A-N associated with it. The image data for those on-us documents which are processed by the IPC-A which have POPs which are associated with IPC-B, for example, will be sent via the communications network 229 to the IPC-B and placed in the image file means 100 thereat to enable the IPC-B to prepare the necessary reports, application posting, etc., for its associated POPs B-1 through B-N. The communications network 229 facilitates inquiry on an on-line basis.

IPC 230 in FIG. 9 may be configured to handle special entries such as those associated with the use of a credit card (as for example, VISA). In this situation the images or entry records 74 (FIG. 3) could be produced at any POA within the banking system 10 and transmitted to the IPC 230 for processing thereat as already explained.

The banking system 10 is flexible enough to permit the processing performed by the system 10 to be performed for banks outside the system 10.

Figure 5A:
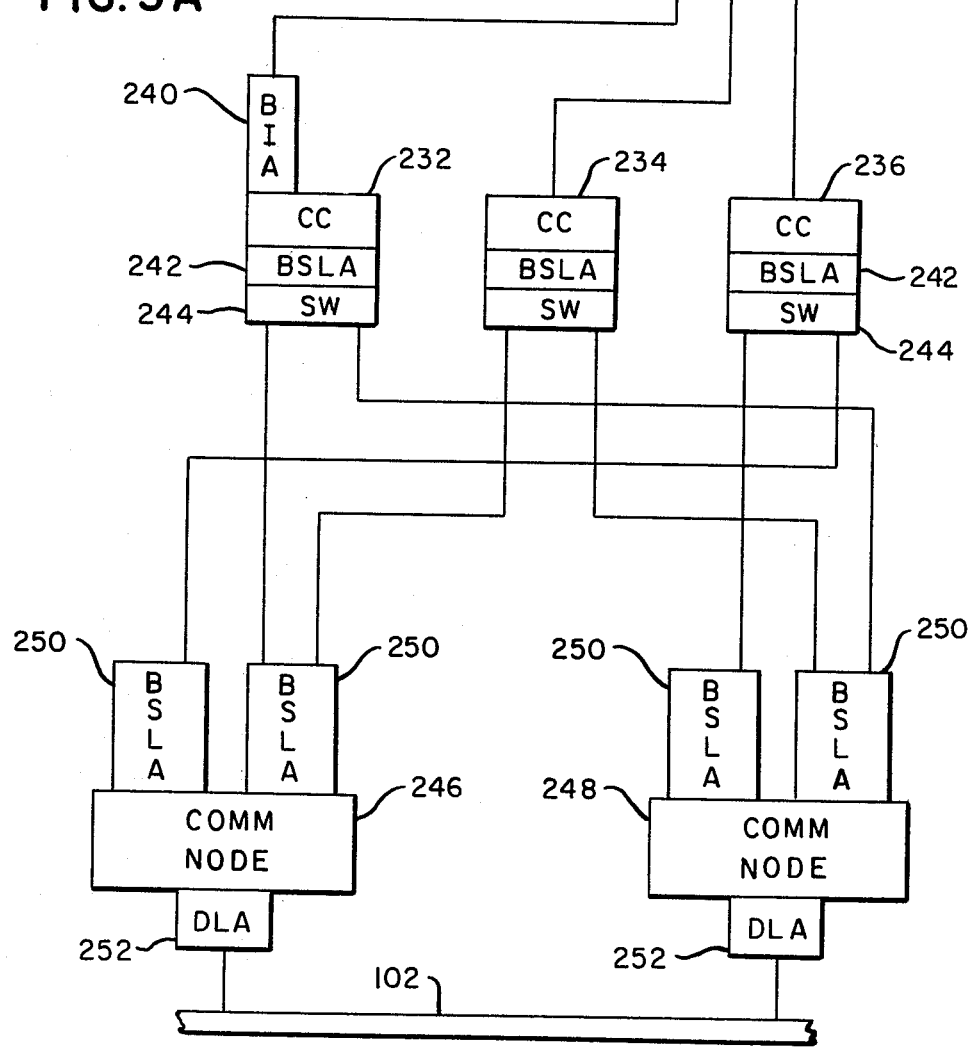
FIGS. 5A through 5F taken together show the various elements included at an image processing center.

FIG. 5A shows an expanded block diagram of the communication means 88 shown in FIG. 1. The communication means 88 includes a conventional buffered intelligent adaptor 230 (BIA) which is used for buffering the information (entry records 74) from the ILU 22 at a POA 12 to a communication controller (CC) such as 232, 234 or 236 via a conventional, digital-data-system switch 238. In the banking system 10, only two of the CC's 232, 234, or 236 are used at any one time, and the remaining CC is used simply as a back-up controller in the event that one of the CCs malfunctions or becomes inoperative. A conventional BIA 240, similar to BIA 230 is used to operatively couple the associated controller, like CC 232 with the DDS switch 238. The DDS switch 238 is an electronic switch which performs the necessary switching function to switch out an inoperative communications controller (any one of CC 232, 234, or 236) and substitute therefor, the back-up controller. Each of the CCs like CC 232, for example, has a conventional, bit serial link adapter BSLA 242 and a conventional electronic switch 244 operatively coupled to the communication nodes 246 and 248 via the conventional bit serial link adapters 250. The communication node 246 includes a processor such as an NCR Criterion 8470 with 750 K bytes of memory, although other conventional processors and their associated conventional interfaces such as BSLA 242 and BSLA 250 may be used.

The communications controllers 232, 234, and 236 (FIG. 5A) act as buffers in controlling the flow of the entry records 74 to the communications nodes 246, 248 which also include memory to store portions of an entry record 74. Conventional direct link adapters 252 are used to couple the communication nodes 246, 248 to the system bus 102. When all the portions of an entry record 74 are received at one of the communication nodes 246, 248 all of these portions of an entry record are then routed to the image file means 100 (FIG. 1) under the control of an image file processor 254 (FIG. 5B) which is included in the image file means 100. When all the entry records 74 for a transaction group are received at the image file means 100, an end of documents 18 signal from the input hopper 24 shown in FIG. 3A indicates this fact to the system manager 108.

Figure 5B:
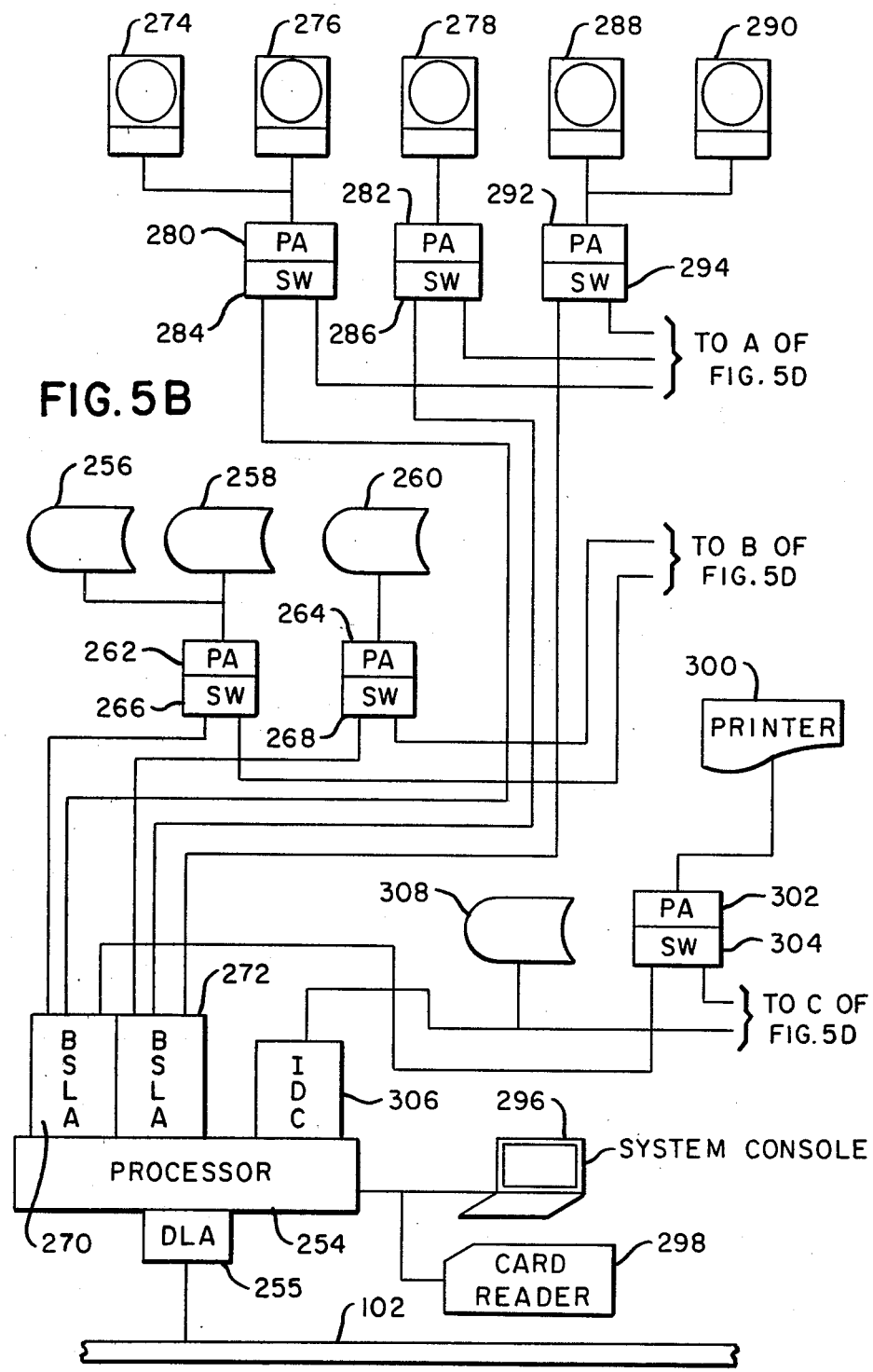
Figure 5C:
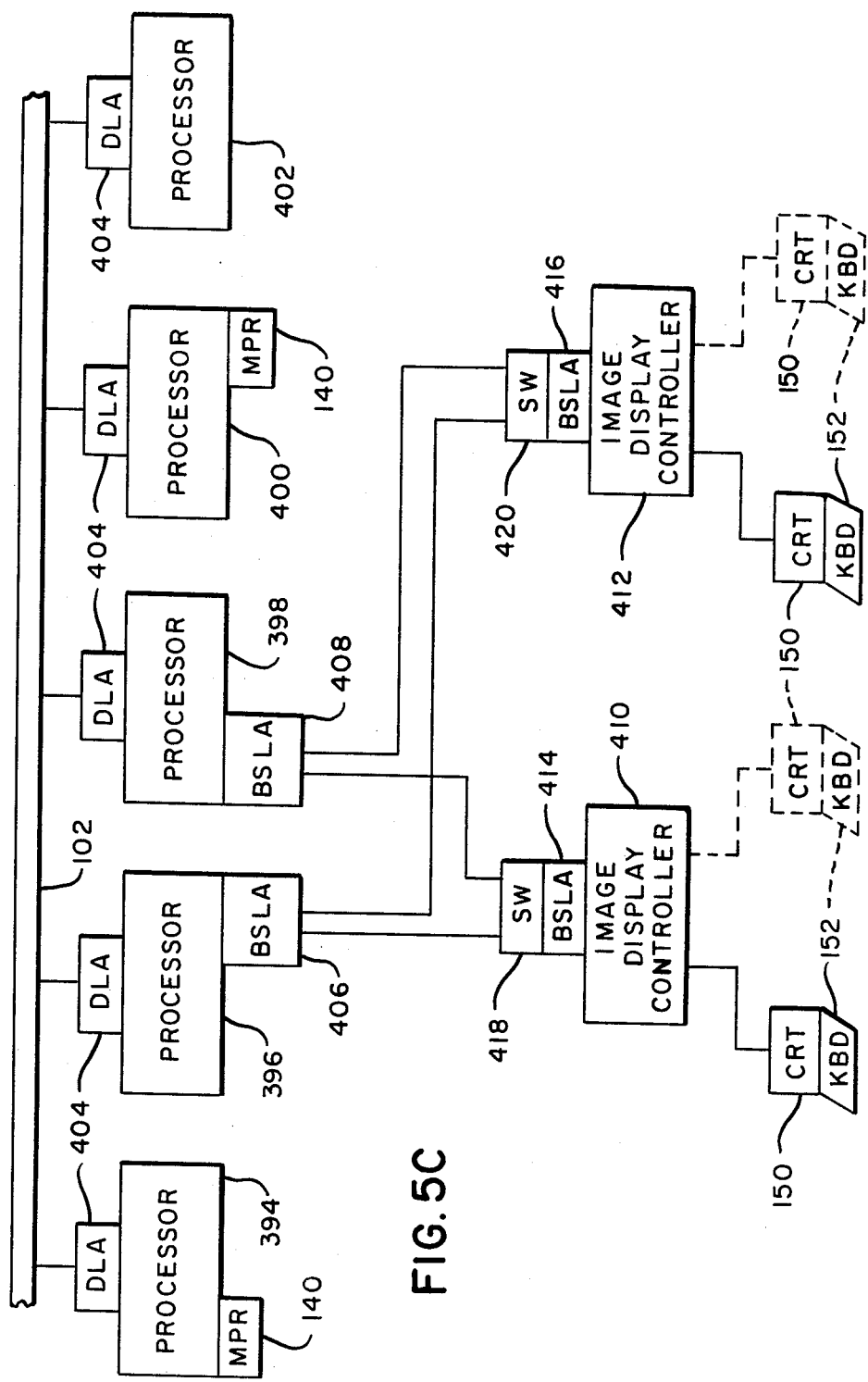

The image file means 100 (FIG. 1) is shown in more detail in FIG. 5B. Basically, the function of the image file means 100 is to store the raw images or entry records 74 received from the POAs 12, and consequently, any conventional storing means may be used. For example, the processor 254 may be a conventional processor such as an NCR Criterion 8570 with two megabytes of memory, with the processor 254 being used to write the entry records 74 on conventional memory units such as magnetic disc units 256, 258, and 260 (such as NCR 6550 disc units ) which comprise the primary storage 104 (FIG. 1). Th disc units 256, 258, and 260 are conventionally interfaces with the processor 254 via conventional peripheral adapters 262 and 264 (PA), electronic switches 266 and 268 (SW), and bit serial link adapters 270 and 272 (BSLA) as shown in FIG. 5B. The processor is interfaced with the system bus 102 via a conventional direct link adapter (DLA) 255. The back-up storage or archival storage system shown as a video disc 106 in FIG. 1 may include an conventional system such as the video recorders 274, 276, and 278 shown in FIG. 5B. These video recorders 274, 276, and 278 are interfaced with the processor 254 via conventional peripheral adapters (PA) 280 and 282, electronic switches 284 and 286 and the BSLAs 270 and 272. Conventional video disc readers 288 and 290 are similarly, conventionally interfaced with the processor 254 via PA 292, electronic switch SW 294, and the BSLA 274 as shown in FIG. 5B. The processor 254 has a system console 296, card reader 298, and print- er 300 associated therewith due to the particular processor 254 selected for use in the system 10; however, these elements are not absolutely necessary for the system 10. The printer 300 is interfaced with the BSLA 270 via a conventional peripheral adapter (PA) 302 and electronic switch 304 as shown in FIG. 5B. The processor 254 has a conventional integrated disc controller 306 associated therewith, with the associated program or operating instructions being recorded on a conventional medium such as magnetic disc unit 308.

The system manager 108 (FIG. 1) includes a system service processor 310 (FIG. 5D) which may be a conventional processor such as an NCR Criterion 8570 with one megabyte of memory, with the processor 310 being interfaced to the system bus 102 via a conventional direct link adapter (DLA) 312. The processor 310 has two bit serial link adapters (BSLA) 314 and 316 associated therewith. The electronic switches 284, 286 and 266 shown in FIG. 5B are interfaced with the BSLA 314, and the electronic switches 294 and 268 are interfaced with the BSLA 316 to enable the processor 310 to provide a back-up function for the processor 254 (FIG. 5B).

The processor 310 (FIG. 5D) has associated therewith, a printer 318, PA 320, electronic switch 322, console 324, and card reader 326 which are identical to the same counterparts already described in relation to the processor 254 shown in FIG. 5B. The electronic switch 322 and the electronic switch 304 (FIG. 5B) are interfaced with the BSLA 316 as shown.

Figure 5D:
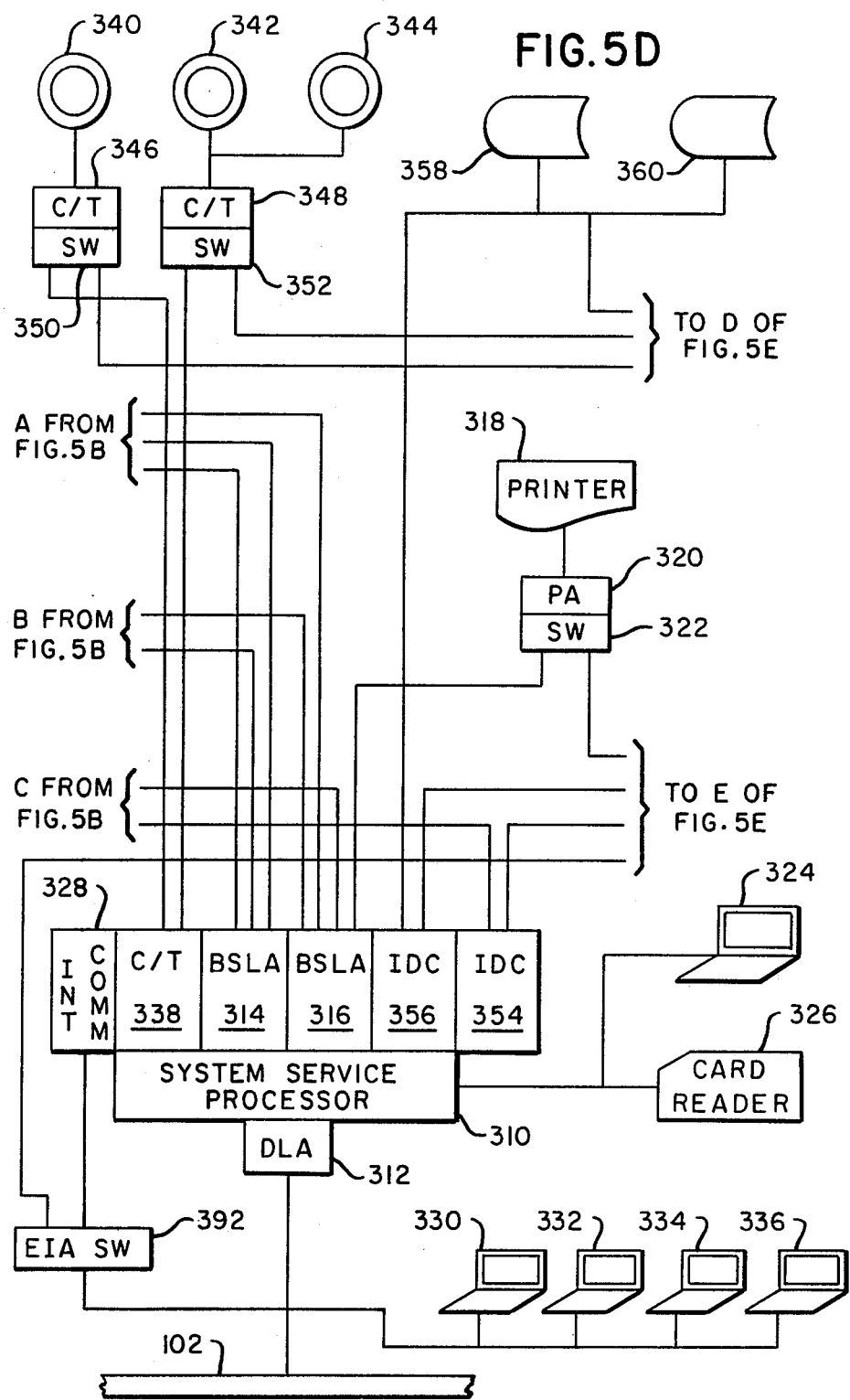

The processor 310 (FIG. 5D) has associated therewith a conventional integrated communications controller 328 which is used for controlling the remote consoles 330, 332, 334 and 336. The processor 310 also has associated therewith a common trunk unit 338 (C/T) which is used for interfacing the processor 310 with the magnetic tape drives 340, 342, and 344 via the common trunk units 346 and 348, and the electronic switches 350 and 352 as shown in FIG. 5D. The processor 310 has a conventional integrated disc controller (IDC) 354 which is interfaced with the magnetic disc unit 308 (FIG. 5B) and the IDC 306 associated with the processor 254. A second IDC unit 356 (FIG. 5D) associated with the precessor 310 is coupled to the magnetic disc units 358 and 360 (FIG. 5D) and IDC 362 associated with a processor 364 (FIG. 5E) which is included in the data file means 114 shown in FIG. 1. The IDC 356 (FIG. 5D) is also interfaced with the magnetic disc units 366, 368, and 370 (FIG. 5E) and a second IDC 372 associated with the processor 364. The IDC 354 (FIG. 5D) is interfaced with the magnetic disc units 374, 376, and 378 (FIG. 5E) and the IDC 362 as shown. The disc units 374, 376, and 378 comprise the primary storage 116 shown in FIG. 1, and the disc units 366, 368, and 370 comprise the optionally-provided backup storage 118 (FIG. 1) which may also be video discs.

The processor 364 (FIG. 5E) included in the data file means 100 is identical to the processor 310 (FIG. 5D) and has the usual console 380 and card reader 382 associated therewith. The processor 364 is interfaced with the system bus 102 via a conventional DLA 384 and is also interfaced to the magnetic tape drives 340, 342, and 344 (FIG. 5D) via a common trunk (C/T) 386. The processor 364 has a BSLA 388 associated therewith for interfacing the processor 364 with the printer 318 shown in FIG. 5D, and it also has an ICC 390 (similar to ICC 328) for interfacing the processor 364 with the remote consoles 330-336 and the ICC 328 (FIG. 5D) via a communications switch 392, which may be a high speed communications switch manufactured by T-Bar Corporation.

The data development means 112 (FIG. 1) is shown in more detail in FIG. 5C and includes a plurality of conventional processors 394, 396, 398, 400 and 402 (such as NCR Criterion 8470s) which are interfaced with the system bus 102 via conventional direct link adapters (DLA) 404, and which perform the various functions shown in FIG. 10. The processor 396 has a BSLA 406 associated therewith, and similarly, the processor 398 has a BSLA 408 associated therewith to interface both of these processors with the image display controllers 410, 412 via the BSLAs 414 and 416 and the electronic switches 418 and 420 as shown in FIG. 5C to provide a back-up function as previously described. Each of the display controllers 410, 412 has the plurality of CRTs 150 and keyboards 152 associated therewith to provide for the human interpretation step 146 (FIG. 4) and to provide for the data completion function 148 (FIG. 10) already discussed herein.

The processor 394 (FIG. 5C) has the machine pattern recognition unit (MPR) 140 associated therewith to perform automatic reading of the monetary amounts and the conversion of pre-encoded E13B information, for example, on the images of the documents 18 to machine-readable data as already discussed in relation to the data scheduling function 136 (FIG. 10). The MPR unit 140 has a conventional decompression unit included therein to decompress the compressed images of the documents 18 received from the image file means 100. Processor 400 has a similar MPR unit 140 associated therewith to provide a back-up function for processor 394.

The processors 396 and 398 (FIG. 5C) are dedicated to handling the images of the documents 18 coming from the image file means 100, while the processors 394, 400, and 402 are utilized to perform most any of the functions shown in FIG. 10. The processors 396 and 398 have sufficient memory capacity associated therewith to buffer the images of the documents 18 and to maintain a smooth flow of images to the CRTs 150. Conventional inquiry and flagging techniques are utilized to indicate when one of the processors 396, 398 requires, for processing, the images and entry data for specific types of documents 18, and a request is made over the system bus 102 to the processor 402 which performs the data scheduling function 136. The system manager 108 is aware of the transaction groups of documents 18 which are complete in the image file means 100. The processor 402, when performing the data scheduling function 136, selects a transaction group to be routed from the image file means 100 to the waiting processor 396 or 398 via the system bus 102. Generally, each processor 396 or 398 handles the entry records 74 as individual items; therefore, it is conceivable that the processing of a single transaction group can be shared by these processors. The data scheduling function 136 (FIG. 10) includes scheduling the images (using, for example, processor 402 in FIG. 5C) for a transaction group according to the TLR# so as to facilitate the integration of elements of data which are developed at the data development means 112 and eventually filed in the data file means 114.

The MPR unit 140 includes a conventional character recognition reader which reads the decompressed image of a document 18 and ascertains the monetary amount thereon. After completion at the MPR unit 140, all the developed data for a document 18 is analyzed for completeness. When data is missing, the associated image is routed to one of the processors 396, 398 for display on one of the CRTS 150 where an operator keys in the appropriate data on an associated keyboard 152. The image display controllers 410 and 412 have conventional decompression units associated therewith for the purpose of permitting operator viewing of the images from the file means 100. The operators complete the data completion function 148 (FIG. 10) by keying in the appropriate data such as monetary amounts (if necessary) while using the keyboards 152. The processors 396 and 398 have appropriate programs associated therewith for controlling the flow of images to the appropriate CRTs 150 (FIG. 5C).

Figure 5E:
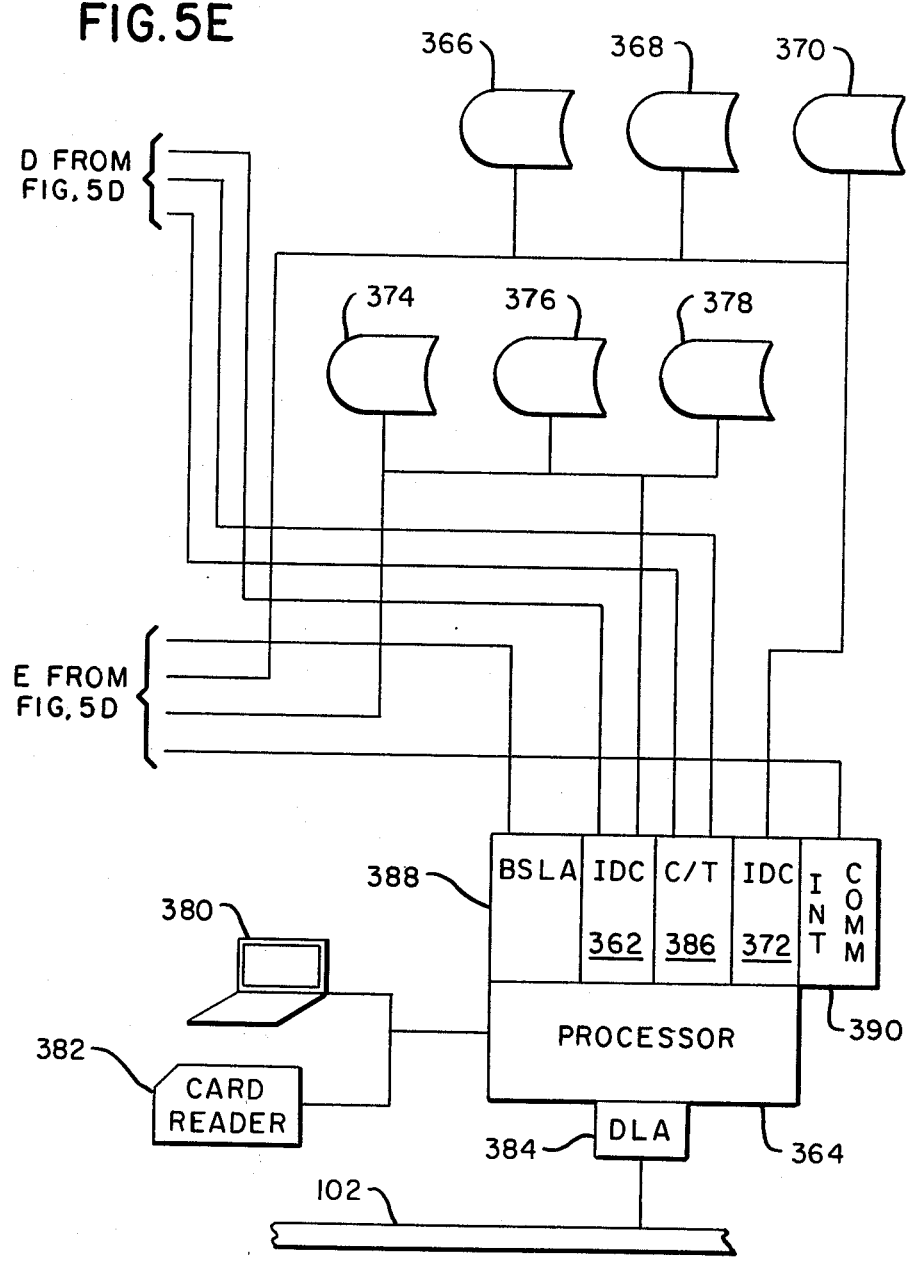

In addition to pefomring the back-up function for processor 394, the processor 400 (FIG. 5C) typically performs the data qualification function 154 and the transaction group consolidation function 156 shown in FIG. 10. Essentially, the qualification function 154 performed by processor 400 relates to verifying the data contents to insure completeness and correctness of the developed data and also relates to adding document routing instructions which are used by the storing means 120 to "break out" the documents 18. The qualification function 154 also insures that all data records 74-D for a transaction group have been stored in the data file means 114. The entry records 74 for a transaction group of documents 18 most likely arrive in a random order in preparation for the qualification function 154; because they arrive in a random order, they are out of order according to the TLR#s within a transaction group. As a result of the entry records 74 being worked on by a plurality of operations at the CRTs 150 and keyboards 152, a check-off operation (to insure all entry records 74 are present and arranged by TLR# within a transaction group) completes the "batch" or group qualification function 156. When the data records 74-D for a particular transaction group are qualified as discussed in the data qualification function 154, they are considered qualified data 162 (FIG. 4) and accordingly, the data records 74-D for this transaction group are placed in the data file means 114 via the precessor 402, system bus 102, and the processor 364 (FIG. 5E). At this time, it should be noted that the image of a document from the entry record 74 is not filed with the data which has been developed in machine-readable form by the data development means 112 and the image is not used during the data qualification, batch consolidation, batch analysis and proving functions 154, 156, and 158, respectively, being performed at the data development means 112. Consequently, the data which is put into the data file means 114 for a particular document 18 has been referred to as data record 74-D. The image for a particular document 18 whose data record 74-D is stored in the data file means 114 can be obtained from the image file means 100 by using the associated TLR#.

After the batch consolidation function 156 is completed, the previously described batch analysis and proving function 158 (FIG. 10) is performed on processor 402 in FIG. 5C. The data records 74-D for a particular transaction group which do not balance out during the proving function 158 are considered non-proved or non-qualified data 164 (FIG. 4) and are placed in the data file means 114 where they are retained until the necessary correction entries are resolved by the associated POA 12 as previously explained herein. Whenever the data records 74-D for a transaction group are placed in the data file means 114 via the associated processor 364 (FIG. 5E), the status of these data records (qualified or non-qualified) is relayed to the processor 310 in the system manager 108.

Periodically during the day, a request is made by an operator at the POA 12 via the keyboard 92 (FIG. 1) for those transaction groups whose data records 74-D have been qualified, and the processor 310 (FIG. 5D) responds thereto via the system bus 102 and the communication means 88 by printing on the printer 96 at the POA 12 a list of the qualified transaction groups. The documents 18 for qualified transaction groups are then physically shipped from the POA 12 to the IPC 14 as previously discussed in relation to FIG. 6.

When the documents 18 for a qualified transaction group are received at the IPC 14, they are physically sorted at the sorting means 120 and encoded at the document encoder qualifier means 122 as previously discussed in relation to FIG. 7.

Figure 5F:
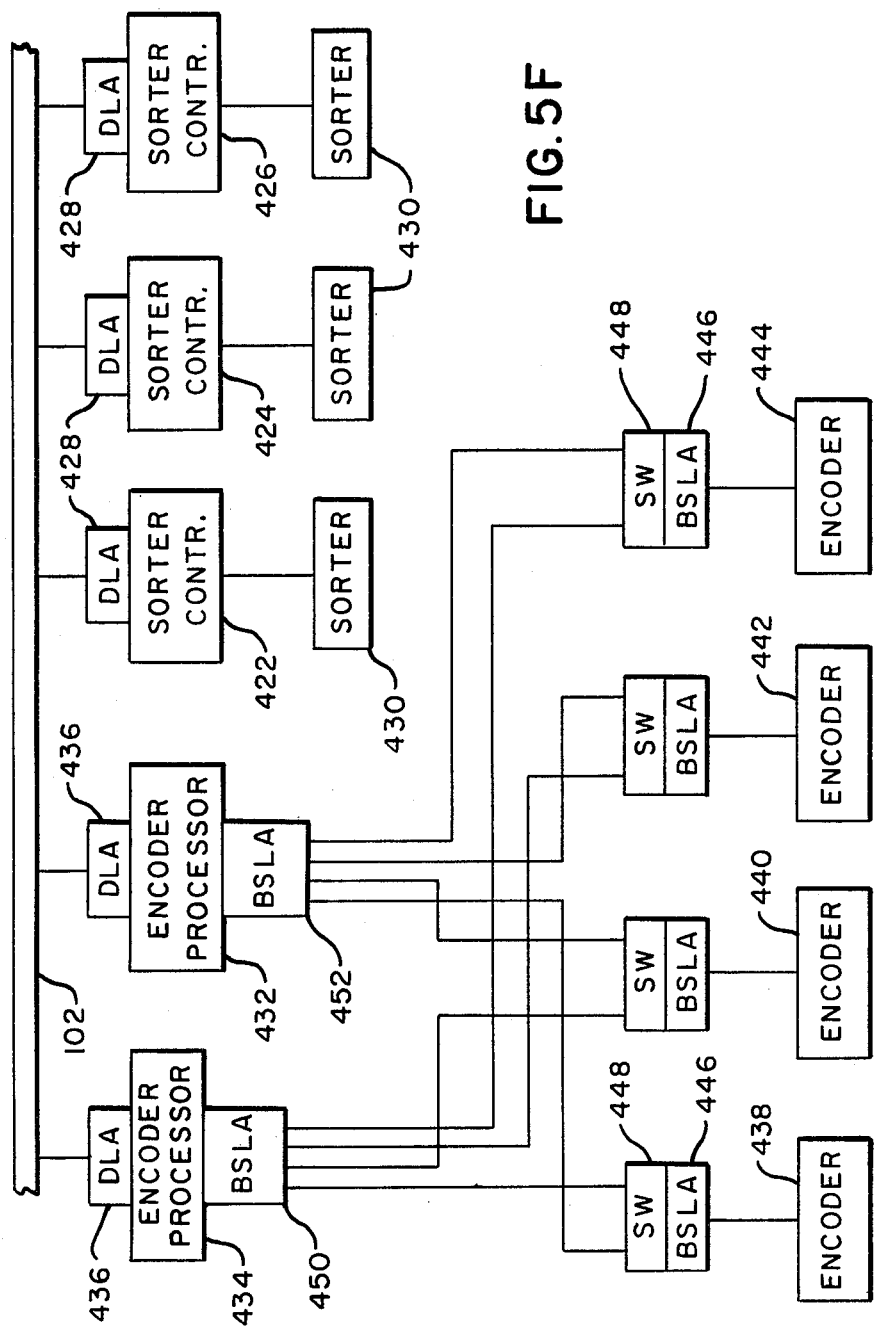

The sorting means 120 (FIG. 1) and the encoder qualifier means 122 are shown in more detail in FIG. 5F.

The sorting means 120 includes conventional sorter controllers 422, 424, and 426 (such as NCR 6780 controllers) which are interfaced with the system bus 102 (FIG. 5F) by appropriate direct link adapters (DLA) 428. Each of the sorter controllers 422, 424, and 426 is coupled to a conventional sorter 430 such as an NCR 6780 sorter; however, these sorters 430 have been conventionally modified to include a bar code reader to read the coded information which was placed on each document 18 at the ILU 22 as previously explained. The sorting techniques effected on the sorting means 120 have been previously described herein in relation to FIG. 7; however, it is important to stress that the sorting is controlled by the data records 74-D for the documents 18 rather than the documents 18 themselves.

The document encoder qualifier means 122 (FIG. 1) is shown in more detail in FIG. 5F and includes an encoder qualifier processor 432 and a back-up encoder qualifier processer 434 which are interfaced with the system bus 102 by conventional direct link adapters (DLA) 436. The encoder qualifier processors 432 and 434 are conventionally interfaced with a plurality of encoders 438, 440, 442, and 444 by bit serial link adapters (BSLA) 446 and electronic switches (SW) 448, and by the BSLAs 450 and 452 as shown in FIG. 5F to provide a back-up function. The encoders like 438 are conventional and perform the function of encoding or printing the monetary amount of a check for "transit" documents in magnetic ink. After encoding, the entire MICR band of data is MICR read to verify that the associated FRD-ABA (Federal Reserve District-American Bankers Association) numbers are MICR readable by correlating the document 18 with its associated data record 74-D. The document encoder qualifier means 122 is conventional and utilizes an application program and general software for file and control.

From what has been described herein, it is apparent that the banking system 10, described herein, permits the use of an image representation of a document 18 to perform all processing functions which in prior art systems require the physical presence of the documents 18 themselves to perform.

Some of the basic functions of the system 10 which are performed through using the images of the documents 18 are:

(1) Deriving all valid data required for updating financial accounting systems;
(2) Auditing each financial entry or data record (derived from the image of the document) to insure that all required data such as data, bank, account number, amount, signature, and endorsements are present.
(3) Performing transaction balancing;
(4) Displaying the data records and associated images for making acceptance or rejection decisions with regard to the associated documents and for answering account holders' inquiries with regard to the documents;
(5) Preparing surrogates or copies of the documents when required by an account holder or a bank in answering protests; and
(6) Maintaining an archival record of the data records and associated images for the documents.

Some of the basic features or advantages of the banking system 10 are:

(1) The ability to remove the account holders dependency on the original paper document 18 by providing either an electronic or paper facsimile of the original document for all account maintenance functions;
(2) The reduction in the movement of paper between banks to support financial entry processing systems by moving an image and data derived from the paper in electronic form for the processing functions;
(3) The ability to provide all information about a financial entry without having to physically locate and retrieve the original document 18;
(4) The ability to retrieve all information about a physical document 18 using computer directed random access devices to locate and present the specific information; and
(5) The ability to replicate an image so it may be used simultaneously in geographically dispersed locations as well as multiple locations. This removes the restriction of sequential processing required in paper based systems of the prior art.

What is claimed is:

1. Apparatus for electronic image processing of documents for banking purposes comprising:
   means for generating an electronic digitized image of the entire front and back of each document of a group of documents and also including means for assigning identification data to said documents and to their associated said electronic digitized images;
   means for storing said digitized images and their associated identification data for a said group of documents;
   means for developing source data for a said group of documents from the associated said electronic digitized images of said documents withdrawn from said storing means in the absence of said documents; and
   means for performing banking operations while using said source data and said identification data.

2. The apparatus as claimed in claim 1 further comprising means for recording said source data and said electronic images on a record medium for use in the preparation of banking reports and copies of said documents.

3. Apparatus for the processing of documents for banking purposes comprising:
   means for generating an electronic digitized image of information from the front and back of each document of a group of documents and also including means for assigning identification data to said documents and to their associated electronic digitized images;
   means for storing said electronic digitized images and their associated identification data for a said group of documents;
   means for receiving said electronic digitized images and their associated identification data from said storing means and also including means for developing machine-useable data from said electronic digitized images for a said group of documents in the absence of said documents;
   means for performing accounting operations for said group of documents while using said machine-useable data and said identification data; and
   means for recording said machine-useable data and said electronic digitized images on a record medium for use in the preparation of reports and copies of said documents.

4. A banking system comprising:

a point of acceptance, a processing center, and a point of payment;

said point of acceptance having means for generating an electronic digitized image of the entire front and back of each document of a group of documents presented at said point of acceptance and also including means for assigning identification information to said documents and to their associated said images;

means for transmitting said images and associated identification information for a said group of said documents from said generating means to said processing center;

said processing center comprising:

image storage means for storing said images and associated identification information for a said group of said documents;

data development means for receiving said images and associated identification information for a said group of said documents from said image storage means and for developing machine-useable data therefrom for said group of documents;

said data development means including means for performing transaction balancing on said machine-useable data to produce qualified data from said machine-useable data for a said group of said documents which are in balance;

data storage means for storing said qualified data for a said group of documents;

means for sorting a said group of documents according to outclearing destinations while using the associated said qualified data therefor;

means for interfacing said qualified data for said group of documents with conventional application systems for the preparation of reports and the like; and means for reproducing on an archival file said qualified data and said images of information for those documents for which account responsibility is had at said point of payment for use thereat.

5. A banking system comprising:

a point of acceptance, a processing center, and a point of payment;

said point of acceptance having means for generating an image of information from each document of a group of documents presented at said point of acceptance and also including means for assigning identification information to said documents and to their associated said images;

means for transmitting said images and associated identification information for a said group of said documents from said generating means to said processing center;

said processing center comprising:

image storage means for storing said images and associated identification information for a said group of documents;

data development means for receiving said images and associated identification information for a said group of said documents from said image storage means and for developing machine-useable data therefrom for said group of documents;

said data development means including means for performing transaction balancing on said machine-useable data to produce qualified data from said machine-useable data for a said group of said documents which are in balance;

data storage means for storing said qualified data for a said group of documents;

means for sorting a said group of documents according to outclearing destinations while using the associated said qualified data therefor;

means for interfacing said qualified data for said group of documents with conventional application systems for the preparation of reports and the like; and means for reproducing on an archival file said qualified data and said images of information for those documents for which account responsibility is had at said point of payment for use thereat;

said generating means including means for generating an electronic image of information of the front and back of each said document;

said generating means further including means for compressing said electronic images, and said data development means including means for decompressing said electronic images to produce decompressed electronic images and also including means for automatically reading said decompressed electronic images to produce at least a portion of said machine-useable data; and said data development means further including means for displaying said decompressed electronic images and also including keyboard means for entering data read from said decompressed electronic images to produce a portion of said machine-useable data.

6. The banking system as claimed in claim 5 in which said sorting means includes means for utilizing said identification information on said documents to assist in sorting said documents according to said outclearing destinations.

7. The banking system as claimed in claim 6 further including means for encoding with transit and amount information those of said documents which are associated with banks not included within said banking system.

8. The banking system as claimed in claim 7 in which each of said image processing centers has a plurality of said points of acceptance and a plurality of said points of payment associated therewith.

9. The banking system as claimed in claim 8 in which each said point of payment has means for receiving said archival file and also has means for displaying said qualified data and said images of information on said archival file for making acceptance and rejection decisions with regard to said documents associated with said qualified data and said images of information and for answering account holders' inquiries with regard to said documents.

10. The banking system as claimed in claim 9 in which each said point of payment further comprises means for reproducing a copy of a said document from said archival file.

11. Apparatus for processing information comprising:

means for storing an electronic image of information and identification information for each document of a group of documents;

data development means for receiving said images of information and associated identification information for a said group of said documents from said storing means and for developing machine-useable data therefrom for said group of documents;

said data development means including means for performing transaction balancing on said machine-useable data to produce qualified data from said machine-useable data for a said group of said documents which are in balance;

data storage means for storing said qualified data for a said group of documents;

means for sorting a said group of documents according to outclearing destinations while using the associated said qualified data therefor; and means for reproducing on an archival file said qualified data and said images of information.

12. A banking system comprising:

a point of acceptance, a processing center, and a point of payment;

said point of acceptance having means for generating an electronic digitized image of the entire front and back of each document of a group of documents presented at said point of acceptance and also including means for assigning identification information to one side of said documents and to their associated said images;

means for transmitting said images and associated identification information for a said group of said documents from said generating means to said processing center;

said processing center comprising:

image storage means for storing said images and associated identification information for a said group of said documents;

data development means for receiving said images and associated identification information for a said group of said documents from said image storage means and for developing machine-useable data therefrom for said group of documents;

said data development means including means for performing transaction balancing on said machine-useable data to produce qualified data from said machine-useable data for a said group of said documents which are in balance;

data storage means for storing said qualified data for a said group of documents;

means for sorting a said group of documents according to outclearing destinations while using the associated said qualified data therefor and said identification information on said documents;

means for interfacing said qualified data for said group of documents with conventional application systems for the preparation of reports and the like;

means for reproducing on an archival file said qualified data and said images for those documents for which account responsibility is had at said point of payment for use thereat; and means for managing the flow of said images and associated identification information and said machine-useable data in said system.

13. The apparatus as claimed in claim 12 in which said assigning means includes means for printing said identification data on said one side of said document which is the back side which is opposite to the front side of said document which contains thereon pre-printed data such as an account number.

14. The apparatus as claimed in claim 13 in which said generating means includes first and second imagers for generating said electronic digitized image of said front and back of each said document of said group of documents.

15. A method of processing documents for banking purposes comprising:

generating an electronic image of information from each document of a group of documents, and also assigning identification information to said documents and to their associated said electronic images;

storing said electronic images and their associated said identification information in a storage means for a said group of documents;

withdrawing from said storage means said electronic images and associated identification information for a group of said documents and developing machine-useable data from said electronic images for a said group of said documents; and performing accounting operations while using said machine-useable data and said identification information in the absence of said documents.

16. A method of processing documents for banking purposes comprising:

generating an electronic image of information from each document of a group of documents and also assigning identification information to said documents and to their said electronic images;

storing said electronic images and their associated said identification information in a storage means for a said group of said documents;

withdrawing from said storage means said electronic images and associated identification information for a group of said documents and developing machine-useable data from said electronic images;

performing accounting operations while using said machine-useable data and said identification information in the absence of said documents; and recording on a record medium said electronic images, said identification information, and said machine-useable data for use in the preparation of reports and copies of said documents.

17. In a banking system having at least a point of acceptance, a processing center, and a point of payment, the method of banking comprising:

generating an image of information from each document of a group of documents presented at said point of acceptance and also assigning identification information to said documents and to their associated images;

storing said electronic images and their associated said identification information in a storage means located at said processing center for a said group of said documents;

withdrawing from said storage means said electronic images and associated identification information for a group of said documents and developing machine-useable data from said electronic images rather than from said documents themselves;

performing transaction balancing for a said group of documents while using said machine-useable data and said identification information in the absence of said documents; and recording on a record medium said electronic images and said machine-useable data for use in the preparation of reports and copies of said documents for use at said point of payment.

18. In a banking system having at least a point of acceptance, a processing center, and a point of payment, a method of processing documents for banking purposes comprising:

generating an image of information from the front and back of each document of a group of documents presented at said point of acceptance, and assigning identification information to the backs of said documents and to their associated images;

storing said images and associated identification information for a said group of documents in an image file means located at said processing center;

withdrawing said images and associated identification information for a said group of documents from said image file means and developing machine-useable data therefrom;

performing transaction balancing for a said group of documents while using said machine-useable data and identification information therefor to produce qualified data for a said group of documents which are in balance;

storing said qualified data in a data storage means at said processing center;

sorting said group of documents associated with said qualified data while using said machine-useable data developed therefor and said identification information;

interfacing said qualified data for said group of documents with application systems for the preparation of reports and the like; and producing an archival file of said qualified data and said images for a said group of documents for use by said point of payment in the preparation of reports and copies of said documents.

19. A method of processing documents for accounting purposes comprising:

generating an electronic digitized image of the entire front and back of each document of a group of documents and also assigning identification data to one side of each of said documents and to their associated said images;

developing source data from said images of said documents in the absence of said documents; and sorting said documents while using said source data and said identification data.

20. A method of banking, comprising:

generating an image of information from each document of a group of documents received in a banking system;

developing data records required for updating financial accounting systems for said banking system from said images;

auditing said data records to insure that all required data is present;

performing transaction balancing on said data records;

displaying said data records and associated images for making acceptance or rejection decisions with regard to said documents associated with said data records and for answering account holders' inquiries with regard to said documents;

preparing copies of said documents, upon request, by using said data records and associated said images; and maintaining an archival record of said data records and associated said images for said documents.

21. The method as claimed in claim 20 in which said generating step comprises generating an image of the front and back of each said document.

* * * * *